US012799395B2

(12) United States Patent
Choi et al.

(10) Patent No.: US 12,799,395 B2
(45) Date of Patent: Nov. 17, 2026

(54) PEROVSKITE NANOCRYSTALS WITH IMPROVED COLLOIDAL STABILITY AND METHOD FOR PRODUCING SAME

(71) Applicant: The Industry & Academic Cooperation in Chungnam National University (IAC), Daejeon (KR)

(72) Inventors: Jihoon Choi, Daejeon (KR); Min-Gi Jeon, Daejeon (KR)

(73) Assignee: The Industry & Academic Cooperation in Chungnam National University (IAC), Daejeon (KR)

(*) Notice: Subject to any disclaimer, the term of this patent is extended or adjusted under 35 U.S.C. 154(b) by 531 days.

(21) Appl. No.: 18/479,939

(22) Filed: Oct. 3, 2023

(65) Prior Publication Data

US 2024/0351906 A1 Oct. 24, 2024

(30) Foreign Application Priority Data

Apr. 18, 2023 (KR) ........................ 10-2023-0050712

(51) Int. Cl.

*C09K 11/66* (2006.01)
*C01G 21/16* (2006.01)
*C09K 11/02* (2006.01)

(52) U.S. Cl.

CPC ............ *C09K 11/665* (2013.01); *C01G 21/16* (2013.01); *C09K 11/025* (2013.01); *C01P 2002/34* (2013.01); *C01P 2004/64* (2013.01); *C01P 2006/90* (2013.01)

(58) Field of Classification Search

CPC .... C09K 11/665; C09K 11/025; C01G 21/16; C01P 2002/34; C01P 2002/2004; C01P 2002/64; C01P 2006/90

See application file for complete search history.

(56) References Cited

U.S. PATENT DOCUMENTS

2022/0306936 A1* 9/2022 Rand ....................... C30B 29/60

FOREIGN PATENT DOCUMENTS

KR 10-2016-0055094 A 5/2016
KR 10-2018-0069687 A 6/2018

OTHER PUBLICATIONS

Jeon et al, "Overcoming charge transfer barriers via electrostatically stabilzed CsPbBr3 nanocrystals for effective perovskite light-emitting diodes", Chemical Engineering Journal, 462 (2023) 142120, pp. 1-10, Feb. 26, 2023.*

Yitong Dong et al., "Bipolar-shell resurfacing for blue LEDs based on strongly confined perovskite quantum dots," nature nanotechnology, Jul. 6, 2020, 2 pages.

Haifeng Zhao et al., "High-Brightness Perovskite Light-Emitting Diodes Based on FAPbBr Nanocrystals with Rationally Designed Aromatic Ligands," ACS Energy Lett., Jun. 8, 2021, 2 pages, American Chemical Society.

(Continued)

*Primary Examiner* — C Melissa Koslow
(74) *Attorney, Agent, or Firm* — Sughrue Mion, PLLC

(57) ABSTRACT

A perovskite nanocrystal having improved colloidal stability and a preparation method thereof are proposed. The perovskite nanocrystal includes a $CsPbX_3$ (X is halogen) perovskite nanocrystal and a hydrazinium ($NH_2$-$NH_3^+$) ligand bonded to a surface of the $CsPbX_3$ perovskite nanocrystal.

13 Claims, 25 Drawing Sheets

(56) References Cited

OTHER PUBLICATIONS

Min-Gi Jeon et al., "Overcoming charge transfer barriers via electrostatistically stabilized CsPbBr3 nanocrystals for efficient perovskite light-emitting diodes," Chemical Engineering Journal, Feb. 26, 2023, 10 pages, Elsevier B.V.

Kayesh, "Performance Enhancement of Solution-Processed Organic-Inorganic Halide Perovskite Solar Cells", Submitted to the University of Tsukuba Graduate School of Pure and Applied Sciences, Feb. 2019 (108 pages total).

* cited by examiner

PEROVSKITE NANOCRYSTALS WITH IMPROVED COLLOIDAL STABILITY AND METHOD FOR PRODUCING SAME

CROSS REFERENCE TO RELATED APPLICATION

The present application claims priority to Korean Patent Application No. 10-2023-0050712, filed Apr. 18, 2023, the entire contents of which is incorporated herein for all purposes by this reference.

BACKGROUND OF THE DISCLOSURE

1. Field of the Disclosure

The present disclosure relates to perovskite nanocrystals with improved colloidal stability and a method for producing the same.

2. Description of the Related Art

Metal halide perovskites (MHP) is a promising candidates for a light-emitting materials owing to their wide color gamut, high color purity, high photoluminescence quantum yield (PLQY), and inexpensive solution processability.

Because of these properties, MHP has attracted development of efficient considerable attention to the perovskite light-emitting diodes (PeLEDs) with high maximum external quantum efficiencies (EQEs) for blue, green, and red PeLEDs.

The recent improvements of electroluminescence (EL) efficiency in PeLEDs (EQEs>20%) were achieved using anti-solvent crystallization for polycrystalline thin films with nanograins and adopting colloidal MHP nanocrystals (NCs). This significantly increases the radiative recombination rate of spatially confined excitons.

In addition, a versatile strategy to enhance stability reportedly reduces surface defects associated with the non-radiative recombination at grain boundaries and the interfaces between MHP NCs through the introduction of surface-binding ligands. Therefore, the interfacial interaction of MHP NCs with the functional groups of organic molecules plays a crucial role in the efficiency of injection charge and exciton recombination, which govern the overall performance of PeLEDs.

The surface-binding ligands on MHP NCs provide colloidal long-term stability and high PLQY. However, low structural integrity and poor luminescence are commonly observed in the MHP NC films during fabrication (i.e. spin-coating) because their stability relies on the rapid attachment-detachment dynamics of surface capping molecules.

In particular, the dynamic equilibrium associated with the formation of $V_{Br-}$ defects is limited owing to mismatched ligands on the surface of MHP NCs, resulting in the formation of non-radiative recombination centers.

Meanwhile, electrically insulating hydrocarbon chains (e.g. oleylamine (OlAm) and oleic acid (OA)) on the MHP surface inevitably hinder efficient charge injection and transportation, which are critical prerequisites for highly efficient PeLEDs.

Several approaches to overcome these challenges have been reported, including the partial or total replacement of these ligands with a combination of shorter fatty acids and amines or engineered surface ligands, such as zwitterionic capping ligands, aromatic ligands, organic halides, and inorganic ligands.

For example, Dong et. al. demonstrated that a bipolar shell consisting of an inner anion and outer cation can enable highly confined $CsPbBr_3$ NCs for efficient green LEDs with an EQE of 22%. Zhao et. al. reported on bright PeLEDs based on pure-green emissive formamidinium lead bromide ($FAPbBr_3$) NCs by substituting long-chain OA ligands with short aromatic molecules of 2-naphthalenesulfonic acid. Other approaches using capping ligands with more reactive functional groups can successfully reduce halide migrations via stronger chemical bonds with the MHP surfaces, exhibiting enhanced PeLED stability.

However, despite progress in the efficiency of PeLEDs via a rational design of surface ligands, many unresolved problems remain. Ligand strategies to minimize the interparticle spacing of MHP NCs significantly lower the steric hindrance between colloidal MHP NCs, and thus increase the diffusion rate related to further crystalline growth. This phenomenon is of critical importance for two-dimensional MHP nanoplatelets (NPLs) because it causes a red-shifted emission spectrum as a result of an increase in NPL thickness. Poor colloidal stability arising from low steric hindrance or electrostatic stabilization leads to another processing issue relevant to film morphology and uniformity, as well as pin-hole formation. Furthermore, locally aggregated ligands imposed by chemically reactive functional groups can result in internal Joule heat and Auger recombination at high current densities. As a result, precise control of the molecular structure of surface-binding ligands is required to overcome several shortcomings of commonly used ligands and their combinations.

DOCUMENTS OF RELATED ART

Non-Patent Literature (Non-patent Literature 1) Nat. Nanotechnol. 2020, 15 (8), 668-674, Dong, Y. Bipolar-Shell Resurfacing for Blue LEDs Based on Strongly Confined Perovskite Quantum Dots.

(Non-patent Literature 2) ACS Energy Lett. 2021, 6 (7), 2395-2403, Zhao, H. High-Brightness Perovskite Light-Emitting Diodes Based on FAPbBr3 Nanocrystals with Rationally Designed Aromatic Ligands.

SUMMARY OF THE DISCLOSURE

In order to solve the above problems, an objective of the present disclosure is to provide perovskite nanocrystals with improved colloidal stability and significantly reduced steric hindrance between colloidal nanocrystal through reasonable design of surface ligands resin, and another objective of the present disclosure is to provide a method for producing the same perovskite nanocrystals.

However, the objectives are illustrative, and the technical spirit of the present disclosure is not limited thereto.

One a first aspect of the present disclosure for achieving the above object relates to a perovskite nanocrystal having improved colloidal stability, the perovskite nanocrystal including: a $CsPbX_3$ (X is halogen) perovskite nanocrystal; and a hydrazinium ($NH_2$-$NH_3^+$) ligand bonded to a surface of the nanocrystal.

In the first aspect, the perovskite nanocrystal having improved colloidal stability may have a particle size of 10 nm or less.

In the first aspect, the perovskite nanocrystal having improved colloidal stability may have an inter-particle distance of 1.8 nm or less.

In the first aspect, the perovskite nanocrystal having improved colloidal stability may have a zeta potential (ζ) of 10 mV or more.

In the first aspect, the perovskite nanocrystal having improved colloidal stability may have a Br/Cs atomic ratio in a range of 2.9 to 3.5.

In the first aspect, the perovskite nanocrystal with improved colloidal stability may have a carrier-trap activation energy ($\Delta E_{trap}$) value of 60 meV or more.

In addition, a second aspect of the present disclosure relates to a method of producing a perovskite nanocrystal with improved colloidal stability, the method including: a) preparing a $CsPbX_3$ (X is a halogen) perovskite nanocrystal dispersion; and b) injecting the $CsPbX_3$ perovskite nanocrystal dispersion into a hydrazinium halide reaction solution and stirring the mixture.

In the second aspect, the $CsPbX_3$ perovskite nanocrystal dispersion has a concentration of 0.5 to 50 mg/ml.

In the second aspect, the hydrazinium halide reaction solution may have a concentration that is higher than 0 and lower than 10 mM.

In the second aspect, the $CsPbX_3$ perovskite nanocrystal dispersion is produced by (i) preparing a precursor solution A containing $PbX_2$, a fatty acid, and a fatty amine, (ii) mixing cesium oleate with the precursor solution A, (iii) collecting nanocrystals from the reactant products of step (ii), and (iv) dispersing the nanocrystals in a dispersion medium.

In the second aspect, the fatty acid may be at least one selected from saturated fatty acids having 14 to 24 carbon atoms and unsaturated fatty acids having 14 to 24 carbon atoms.

In the second aspect, the fatty amine may be at least one selected from saturated fatty amines having 14 to 24 carbon atoms and unsaturated fatty amines having 14 to 24 carbon atoms.

In addition, a third aspect of the present disclosure relates to a light emitting device including the perovskite nanocrystal having improved colloidal stability.

In the case of the $CsPbX_3$ perovskite nanocrystal with improved colloidal stability according to the present disclosure, a hydrazinium ($NH_2$-$NH_3^+$) ligand is bounded to the surface of the $CsPbX_3$ perovskite nanocrystal, instead of a long carbon chain ligand. Therefore, the $CsPbX_3$ perovskite nanocrystals have an improved zeta potential value compared to pure $CsPbX_3$ nanocrystals, resulting in improved colloidal dispersion stability. In addition, since the steric hindrance between colloidal nanocrystals is reduced, the problem of pinhole generation during film formation is prevented, and the film thickness uniformity is improved.

In addition, when the film is applied to a light emitting device, a light emitting device having improved light emission stability can be provided.

DESCRIPTION OF THE PREFERRED EMBODIMENTS

Herein after, perovskite nanocrystals with improved colloidal stability and a method for producing the same will be described in detail. The accompanying drawings are provided as examples to sufficiently convey the spirit of the present disclosure to those skilled in the art. Accordingly, the present disclosure is not limited to the drawings and may be embodied in other forms, and the drawings may be exaggerated to clarify the spirit of the present disclosure. In the flowing description, unless otherwise defined, all terms including technical and scientific terms used herein have the same meaning as commonly understood by those who are ordinarily skilled in the art to which this disclosure belongs. Further, when it is determined that the detailed description of the known art related to the present disclosure might obscure the gist of the present disclosure, the detailed description thereof will be omitted.

Figure 1:
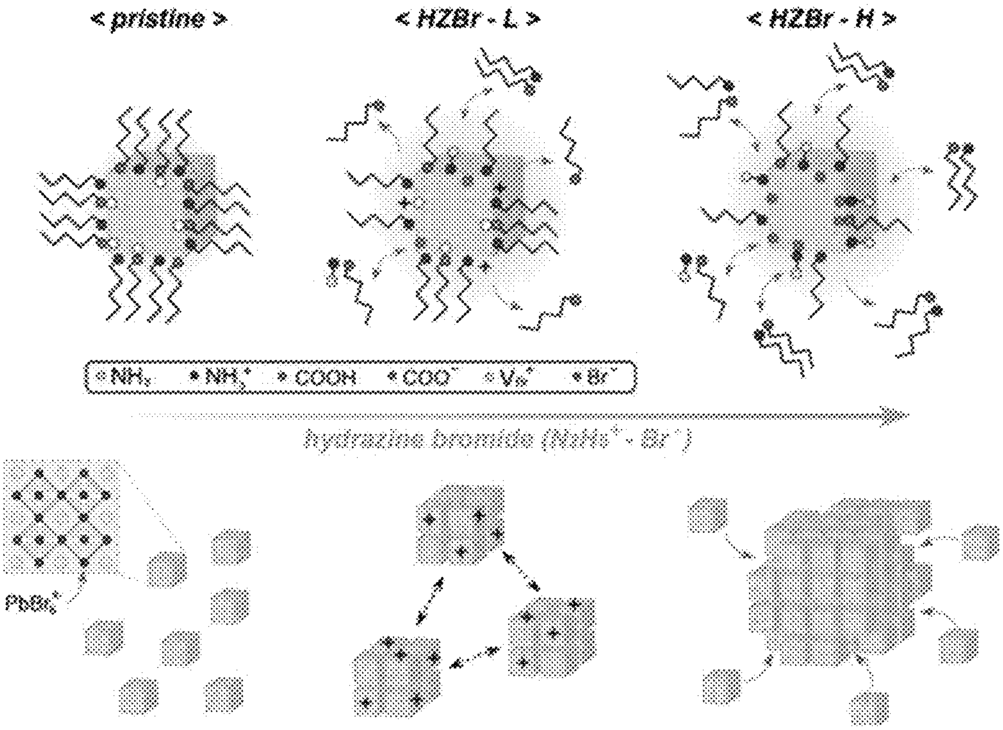
FIG. 1 is a diagram schematically showing surface ligand changes and colloidal stability enhancement of $CsPbBr_3$ nanocrystals (NCs) treated with hydrazine monohydrobromide ($N_2H_5Br$, HZBr) according to an example of the present disclosure.

Referring to FIG. 1, in the case of perovskite nanocrystals to the surface of which hydrazinium ($NH_2$-$NH_3^+$) ligands are not bound, oleylamine and oleic acid ligands are bound to the surface of the $CsPbX_3$ perovskite nanocrystals, resulting in large steric hindrance and low colloidal dispersion stability. Therefore, there is a problem that pinholes occur during film formation, or the film thickness uniformity is low due to aggregation of the nanocrystals.

Accordingly, the present inventors have consistently researched and studied a method for improving dispersion stability of nanocrystals while reducing steric hindrance by using relatively short ligands instead of conventional oleylamine and oleic acid ligands, and finally have found that a hydrazinium ($NH_2$-$NH_3^+$) ligand is used, colloidal dispersion stability can be improved by increasing the surface zeta potential and lowering steric hindrance. On the basis of the finding, the present disclosure hac been made.

Specifically, a first aspect of the present disclosure relates to a perovskite nanocrystal having improved colloidal stability, the perovskite nanocrystal including: a $CsPbX_3$ (X is halogen) perovskite nanocrystal; and a hydrazinium ($NH_2$-$NH_3^+$) ligand bonded to a surface of the nanocrystal.

The $CsPbX_3$ perovskite nanocrystal with improved colloidal stability according to the present disclosure has a hydrazinium ($NH_2$-$NH_3^+$) ligand bonded to the surface thereof instead of a long carbon chain. Therefore, the $CsPbX_3$ perovskite nanocrystals have an improved zeta potential value than pristine $CsPbX_3$, resulting in improved colloidal stability. In addition, the problem of pinhole generation during film formation is prevented, and the film thickness uniformity can be improved.

In addition, when the film is applied to a light emitting device, a light emitting device having improved light emission stability can be provided.

Hereinafter, a perovskite nanocrystal with improved colloidal stability according to an example of the present disclosure will be described in detail.

As described above, a perovskite nanocrystal with improved colloidal stability according to an example of the present disclosure is a $CsPbX_3$ (X is a halogen) perovskite nanocrystals having a surface to which a hydrazinium ($NH_2$-$NH_3^+$) ligand is bound.

In the $CsPbX_3$ perovskite nanocrystal, X may be a halogen, for example F, Br or Cl. Preferably, X may be Br.

The hydrazinium ($NH_2$-$NH_3^+$) ligand is bound to the surface of the $CsPbX_3$ perovskite nanocrystal to improve colloidal dispersion stability and to reduce steric hindrance between colloidal nanocrystals. For example, the hydrazinium ($NH_2$-$NH_3^+$) ligand may be a ligand derived from one or more hydrazinium halides selected from $H_2NNH_2$·HF, $H_2NNH_2$·HBr and $H_2NNH_2$·HCl.

In order to secure excellent colloidal dispersion stability of $CsPbX_3$ perovskite nanocrystals having hydrazinium ($NH_2$-$NH_3^+$) ligands bound to the surface, the perovskite nanocrystals need to have an appropriate zeta potential value. Specifically, for example, the zeta potential ($\zeta$) of the perovskite nanocrystal with improved colloidal stability may be 10 mV or more, and may be more preferably in a range of 15 mV to 30 mV. In the zeta potential is within the specified range, good colloidal dispersion stability can be secured.

The perovskite nanocrystal improved colloidal stability may have a particle size of 10 nm or more and an interparticle distance of 1.8 nm or less because the zeta potential value thereof is 10 mV or more. More specifically, the perovskite nanocrystal having improved colloidal stability may have a particle size of 9 to 10 nm and an interparticle distance of 1.6 to 1.8 nm. It can be confirmed that the colloidal dispersion stability is excellent from the fact that the perovskite nanocrystal has such a particle size and interparticle distance.

In addition, the perovskite nanocrystal having improved colloidal stability have a Br/Cs atomic ratio of 2.9 to 3.5. When the Br/Cs atomic ratio is less than 2.9, the steric hindrance may still be high because the hydrazinium ($NH_2$-

$NH_3^+$) ligand is not sufficiently bonded to the $CsPbX_3$ perovskite nanocrystal, whereas the Br/Cs atomic ratio greater than 3.5 is not good because Br vacancies increase, resulting in many defects in the $[PbBr_6]^{4-}$ octahedral structure, and formation of nanocrystal aggregates.

In addition, the perovskite nanocrystal with improved colloidal stability may have a carrier-trap activation energy ($\Delta E_{trap}$) value of 60 meV or more, more preferably 80 meV or more, and most preferably 90 to 120 meV. When the activation energy value falls within the specified range, the hydrazinium ($NH_2$—$NH_3^+$) ligand is sufficiently bound, thereby preventing Br vacancies and the related defects on the surface.

In addition, a second aspect of the present disclosure relates to a method of producing the perovskite nanocrystal with improved colloidal stability, the method including: a) preparing a $CsPbX_3$ (X is a halogen) perovskite nanocrystal dispersion; and b) injecting the $CsPbX_3$ perovskite nanocrystal dispersion into a hydrazinium halide reaction solution and stirring the mixture.

First, step a) of preparing the $CsPbX_3$ (X is a halogen) perovskite nanocrystal dispersion is performed. Specifically, the $CsPbX_3$ perovskite nanocrystal dispersion is prepared by (i) preparing a precursor solution A containing $PbX_2$, a fatty acid, and a fatty amine, (ii) mixing cesium oleate with the precursor solution A, (iii) collecting nanocrystals from the reactant products of step (ii), and (iv) dispersing the nanocrystals in a dispersion medium.

In one example of the present disclosure, the $PbX_2$ is a precursor material of $CsPbX_3$. Specifically, it is at least one selected from $PbF_2$, $PbBr_2$, and $PbCl_2$, and it is preferably $PbBr_2$.

The fatty acid may be at least one selected from saturated fatty acids having 14 to 24 carbon atoms and unsaturated fatty acids having 14 to 24 carbon atoms. Specifically, for example, the fatty acid may be at least one selected from oleic acid, palmitoleic acid, vaccenic acid, and paullinic acid. Such a fatty acid may be added in an amount of 0.001 to 1 mol, preferably in an amount of 0.005 to 0.01 mol, per 1 mol of $PbX_2$.

The fatty amine may be at least one selected from saturated fatty amines having 14 to 24 carbon atoms and unsaturated fatty amines having 14 to 24 carbon atoms, and specifically, for example, may be one or more selected from hexylamine, octylamine, decylamine, dodecylamine, and oleylamine. Such a fatty amine may be added in an amount of 0.001 to 1 mol, preferably in an amount of 0.005 to 0.01 mol, per 1 mol of $PbX_2$.

When preparing the precursor solution A, a solvent may be further used. The solvent may be used without limitation as long as it is non-reactive. For example, the solvent is 1-octadecene or the like. The solvent may be added in an amount of 5 to 100 ml, and preferably 10 to 50 ml, per 1 mmol of $PbX_2$.

After the precursor solution A is prepared, cesium oleate may be mixed and reacted with the precursor solution A. In this case, the reaction temperature is 70 °C to 200 °C and more preferably 100 °C to 160 °C, and the reaction time is 2 to 20 seconds, and preferably 4 to 8 seconds. With the ranges being satisfied, nanocrystals can be effectively synthesized. With the ranges being satisfied, nanocrystals can be effectively synthesized.

Thereafter, a step of collecting the synthesized nanocrystals and dispersing the collected nanocrystals in a dispersion medium may be performed. In this case, the dispersion medium may be at least one selected from toluene and acetone, but the dispersion medium is not necessarily limited thereto. The concentration of the $CsPbX_3$ perovskite nanocrystal dispersion may be 0.5 to 50 mg/ml and more preferably 1 to 30 mg/ml.

Next, step b) of injecting the nanocrystal dispersion into the hydrazinium halide reaction solution and stirring may be performed.

The hydrazinium halide is to provide a hydrazinium ligand. The hydrazinium halide is at least one selected from $H_2NNH_2 \cdot HF$, $H_2NNH_2 \cdot HBr$, and $H_2NNH_2 \cdot HCl$. Preferably, it is $H_2NNH_2 \cdot HBr$. In this case, the hydrazinium halide reaction solution may further include a solvent, and the solvent may be at least one selected from toluene and acetone, but is not necessarily limited thereto. In addition, the concentration of the hydrazinium halide reaction solution may be higher than 0 and lower than 10 mM, may be preferably 0.1 to 5 mM, and may be more preferably 0.2 to 1 mM. With the specific range being satisfied, perovskite nanocrystals with improved colloidal stability and higher zeta potential can be effectively synthesized.

A further aspect of the present disclosure relates to a light emitting device including the perovskite nanocrystal having improved colloidal stability. As described below, the perovskite nanocrystals with improved colloidal stability can be used to form a perovskite layer of an existing light emitting device. The perovskite nanocrystal has excellent colloidal dispersion stability, pinhole generation can be prevented during film formation, and the uniformity of film thickness can be improved. Due to the advantages, when the film is applied to a light emitting device, the light emitting device has improved light emission stability.

Of course, the other layers of the device may be the same as those of an existing light emitting device.

Herein after, perovskite nanocrystals with improved colloidal stability and a method for producing the same according to the present disclosure will be described in detail, with reference to examples. However, the examples described below are presented only for illustrative purposes and are not intended to limit the scope of the present disclosure. The examples can be embodied in other various forms.

In addition, unless otherwise defined, all technical and scientific terms have the same meaning as that is generally understood by the ordinarily skilled in the art to which the present disclosure pertains. The terminology used in the description herein is merely to effectively describe specific embodiments and examples and is not intended to limit the present disclosure. In addition, the unit of each of the component to be added, which are not specifically described in the specification, may be % by weight (represented as wt %).

HZBr is an interesting additive because of its unique chemical constituents consisting of a hydrazinium ($NH_2$-$NH_3^+$) cation and a $Br^-$ anion. As illustrated in FIG. 1, the hydrogen bonding between the —$NH_3^+$ moiety and the $Br^-$ ion promotes efficient ligand exchange between the relatively long-chain amine ligand with the relatively short-chain $NH_2$-$NH_3^+$ ion. In particular, $[PbBr_6]^{4-}$ octahedra along with the surface-bound ligands can be effectively stripped as more $Pb^{2+}$ ions are reduced in the presence of excess hydrazinium, which acts as a reducing agent. As a result, a net positive charge on the NC surface can be induced by the uncoordinated Pb atoms, which provide (i) attractive sites for coordination with electron-rich molecules (i.e., Lewis bases) such as amine groups (—$NH_2$) having a lone pair of electrons (FIG. 5, calculated electrostatic potential profile of $N_2H_5^+$) and (ii) electrostatic stabilization of colloidal $CsPbBr_3$ NCs.

On the other hand, a stabilized NC surface with controlled defect sites related to $V_{Br^-}$ (i.e., non-radiative recombination centers) can be achieved by strong affinity between $NH_3^+$ and $[PbBr_6]^{4-}$ octahedral structure and excess $Br^-$ anions. This effectively passivates the $Br^-$ vacancies and enhances the radiative recombination of charge carriers. In this study, the inventors hypothesizes that the ionic reactivity between HZBr and $CsPbBr_3$ NC surface moieties governs the structural integrity of $CsPbBr_3$ NCs having highly improved colloidal stability, which ultimately improves the performance of $CsPbBr_3$ NC-based PeLEDs.

[Preparation Example 1] Preparation of Cesium Oleate

Cesium oleate was separately prepared according to a previously reported protocol (Nano Lett. 2015, 15 (6), 3692-3696). 1-Octadecene (ODE, 20 mL) and oleic acid (OA, 1.25 mL) were placed in a 50 mL two-necked round bottom flask equipped with a magnetic stirrer. The flask was heated to 120 °C and held under nitrogen flow for 1 hour. Cesium carbonate ($Cs_2CO_3$, 0.407 g) was put into a flask and stirred at 150 °C until $Cs_2CO_3$ completely reacted with the OA, to prepare cesium oleate (Cs-oleate).

[Preparation Example 2] Preparation of $CsPbBr_3$ NCs $CsPbBr_3$ NCs were synthesized through a hot injection method. 0.069 g of $PbBr_2$ (0.188 mmol) and ODE (5.0 ml) were placed in a 50 ml flask and dried at 120 °C for 1 hour under vacuum conditions. Oleic acid (OA, 0.5 mL) and OlAm (0.5 mL) were put into a flask at 120 °C, and the temperature of the flask was raised to 160 °C under $N_2$ flow. Cs-oleate (0.4 mL) as a solid at ambient conditions was preheated to 100 °C and rapidly injected into the reaction mixture with vigorous stirring. The reaction mixture was cooled after 5 seconds by immersing the flask in an ice bath. The cooled reaction mixture was centrifuged at 6000 rpm for 5 minutes to remove NC aggregates. NCs were collected by adding ethyl acetate in an amount of 2.5 times the volume of the NC reaction mixture and centrifuging the resulting mixture at 8000 rpm for 10 minutes. The supernatant was discarded, and the precipitate was collected and then dispersed in toluene (1 mL) for the subsequent use. The concentration was determined by the weight of the solid residue after drying a certain volume of the solution until reaching a certain mass at 100 °C.

[Example 1] Surface Modification of $CsPbBr_3$ NCs with Hydrazine Monohydrobromide For NC surface modification by hydrazine monohydrobromide ($N_2H_5Br$, HZBr), HZBr dissolved in acetone and toluene was injected into the NC solution while vigorously stirring. The toluene:acetone volume ratio was maintained at 10:1, and the concentrations of NC and HZBr in the final sample were adjusted in the range of 1 to 9 mg/mL to 0.1 to 4 mmol/mL.

Representative samples of $CsPbBr_3$ NCs treated with various amounts of HZBr were labeled (1) HZBr-L (0.5 mM), (2) HZBr-M (1 mM), and (3) HZBr-H (4 mM). Unless otherwise specified, the concentration of NCs is 3 mg/mL and the concentration of HZBr is 0.5 mM.

After the HZBr injection, the samples were stirred for 20 seconds, and then film-casted or processed for characterization. For AFM characterization, the prepared NC solution was spin-coated on poly(ethylenedioxythiophene):polystyrene-sulfonate (PEDOT:PSS) at 3500 rpm for 60 seconds. For XRD and XPS characterization, the NC solution was centrifuged at 11000 rpm for 30 minutes to collect NCs. The collected NCs were dried at 120 °C or drop-casted onto glass slides or Si wafers. All optical measurements on the NC solutions, including PL, absorbance, and zeta potential, were performed in freshly prepared and diluted colloidal solutions to prevent reabsorption of PL.

Evaluation of Properties

1) Analysis Method:

Transmission electron microscopy (TEM) images of NCs were acquired using a JEM 2010 electron microscope operated at 200 kV. X-ray diffraction (XRD) patterns were collected using a Bruker AXS D8 diffractometer using Cu-Kα radiation at λ=1.54 Å. X-ray photoelectron spectroscopy (XPS) spectra of NCs were collected using a Thermofisher Scientific/K-Alpha+X-ray photoelectron spectrometer equipped with a monochromatic X-ray source from Al Kα (hν=1486.6 eV). The solid-to-organic surfactant ratio was determined using thermogravimetric analysis (TGA/DSC1, Mettler-Toledo) under $N_2$ up to 800 °C at a heating rate of 10 °C/min. Fourier transform infrared spectroscopy (FTIR) spectra (400 to 4000 $cm^{-1}$) of NC solutions were obtained using a Bruker ALPHA-P. UV-vis absorption and photoluminescence spectra were recorded under ambient conditions using a Shimadzu UV-2600 UV-vis and Hitachi F-7000 fluorescence spectrometer, respectively. Time-resolved PL (TRPL) decay spectra were obtained using Fluorolog3 with time-correlated single photon counting (TCSPC, Horiba Scientific), with a 375 nm laser excitation source. The fluorescent decay curves were fitted by triexponential fitting.

$$I(t) = C + \alpha_1 \exp\left(-\frac{t}{\tau_1}\right) + \alpha_2 \exp\left(-\frac{t}{\tau_2}\right) + \alpha_3 \exp\left(-\frac{t}{\tau_3}\right) \quad (1)$$

Here, I(t) is the PL intensity, τ is the lifetime, α is the pre-exponential factor, and C is a constant. The average lifetime ($\tau_{avg}$) was calculated as the average of the triexponential decay.

$$\tau_{avg} = \frac{\alpha_1\tau_1^2 + \alpha_2\tau_2^2 + \alpha_3\tau_3^2}{\alpha_1\tau_1 + \alpha_2\tau_2 + \alpha_3\tau_3} = f_1\tau_1 + f_2\tau_2 + f_3\tau_3 + A \quad (2)$$

Here, f is the fractional contribution of each decay component and A is a constant. The accuracy of the fitting was determined to be 1±0.2 by $\chi^2$. The zeta potential of the surface-modified NC solution interface was measured using a Zetasizer Nano ZS (Malvern). Cryogenic PL spectroscopic measurements were performed in the temperature range of from 80 K 300 K using a spectrofluorometer FS5 (Edinburgh Instruments, United Kingdom).

The electro-potential map of hydrazine bromide was obtained by optimizing the molecular structure and using the density functional theory (DFT) and the B3LYP method. Models were created and visualized using Gaussian 09 software and the GaussianView 6.0 interface.

PL and TRPL mapping measurement: Steady-state PL and TRPL mappings were obtained using micro-PL/Raman spectroscopy (XperRam-RF, Nanobase) at room temperature. The sample was excited with a picosecond pulsed diode laser (LDH-DC-405, PicoQuant) having an excitation wavelength of 405 nm (FWHM<50 ps) and a repetition rate of 40 MHz. The excitation laser was modulated in continuous wave mode and pulse mode according to the PL and TRPL measurements. The laser power and exposure time for PL and TRPL measurements were set to 500 nW and 1 ms, respectively, using an objective (40×, NA 0.75, MPlanFLN, Olympus). For the PL measurement, the grating was set to 600 gr/mm. TRPL signals were detected using single photon avalanche diodes (SPAD, PMD series, PicoQuant) and time-correlated single photon counting (TCSPC, TimeHarp 260, PicoQuant).

Low-noise (LN) AFM measurement: A custom LN AFM system for use at a temperature of 21.8±0.1 °C and a humidity level of 21±0.5% was developed by the Korea Research Institute of Standards and Science (KRISS). The temperature can be controlled by circulating a temperature control liquid. The sample surface was examined in tapping mode using a high-density carbon probe (SuperSharpStandard-NCHR; Nanotools, Germany)) a normal probe radius of about 2 nm and a cantilever spring constant of 40 N/m. The cantilever vibrated at 3.18 nm (free air amplitude) with a Q value of 533. The set point for the distance between the probe and the sample was 2.31 nm. The set point was maintained at 7 nm to ensure a large distance to reduce probe damage that may be caused when the AFM probe was brought into contact with the sample. The probe then slowly approached the sample by a distance of 0.1 nm using large proportional and integral gain factors.

Figure 2:
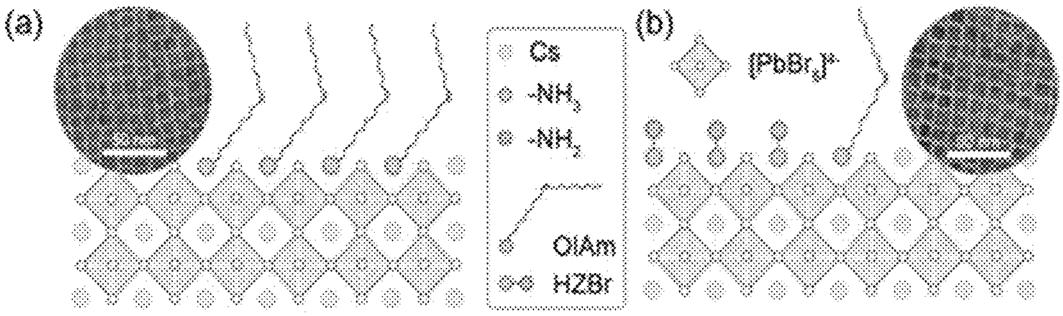
FIG. 2 is a diagram schematically showing the structural characteristics of (a) pure $CsPbBr_3$ NCs and (b) $CsPbBr_3$ NCs (HZBr-L) treated with 0.5 mM of HZBr, with each inset showing transmission electron microscopy (TEM) image with a scale bar of 50 nm.
Figure 3:
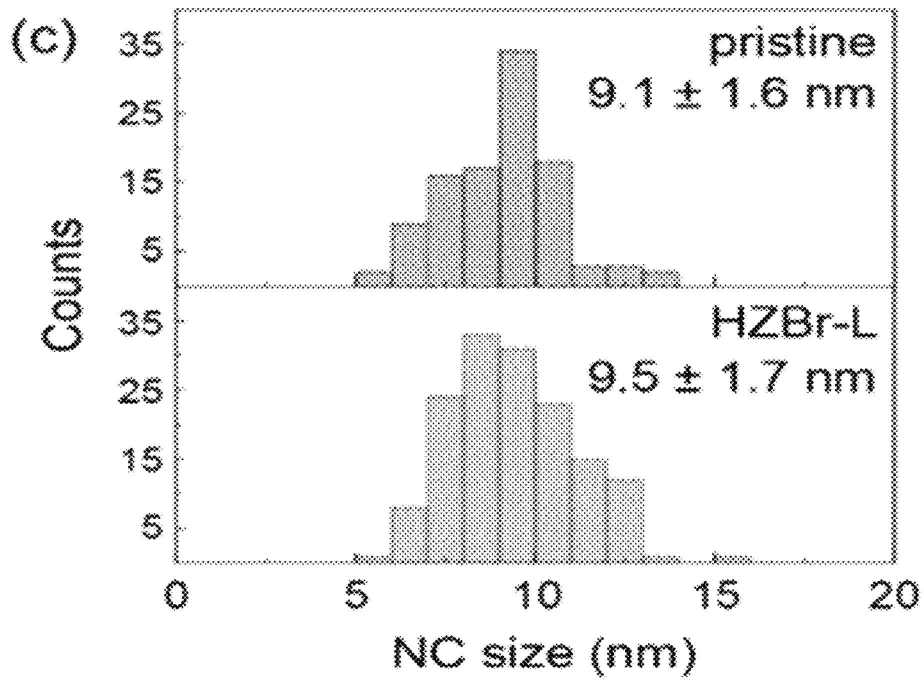
FIG. 3 is data showing the particle size distribution of pure $CsPbBr_3$ NCs and HZBr-L.
Figure 4:
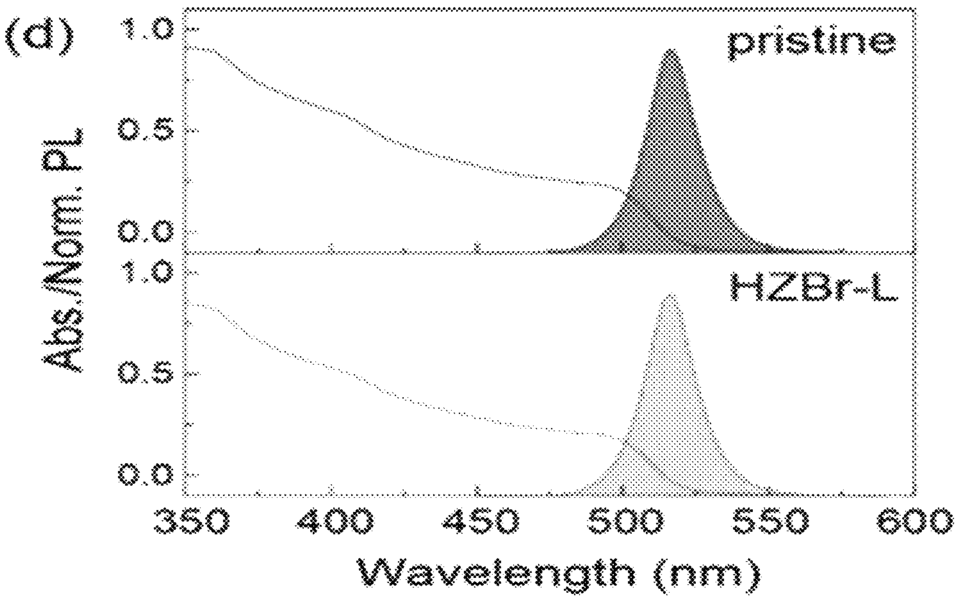
FIG. 4 is data showing absorbance and PL spectra of pure $CsPbBr_3$ NCs and HZBr-L.

2) Analysis;

FIG. 2 is a diagram schematically showing the structural characteristics and optical characteristics of (a) pristine $CsPbBr_3$ and (b) $CsPbBr_3$ NCs (HZBr-L) treated with 0.5 mM of HZBr. In both cases, ammonium groups are well coordinated with the $Br^-$ ions at the surface of the perovskite lattice. FIG. 3 shows the average edge lengths of pristine $CsPbBr_3$ and HZBr-L measured on the TEM images of FIG. 2 (insets of FIG. 2), in which the pristine $CsPbBr_3$ and HZBr-L are uniform cube-shaped nanocrystals with average edge lengths of 9.1±1.6 nm and 9.5±1.6 nm, respectively. FIG. 4 shows absorbance and PL emission spectra of pristine $CsPbBr_3$ and HZBr-L, and similar absorbance and PL emission spectra were observed from both the samples.

Figure 5:
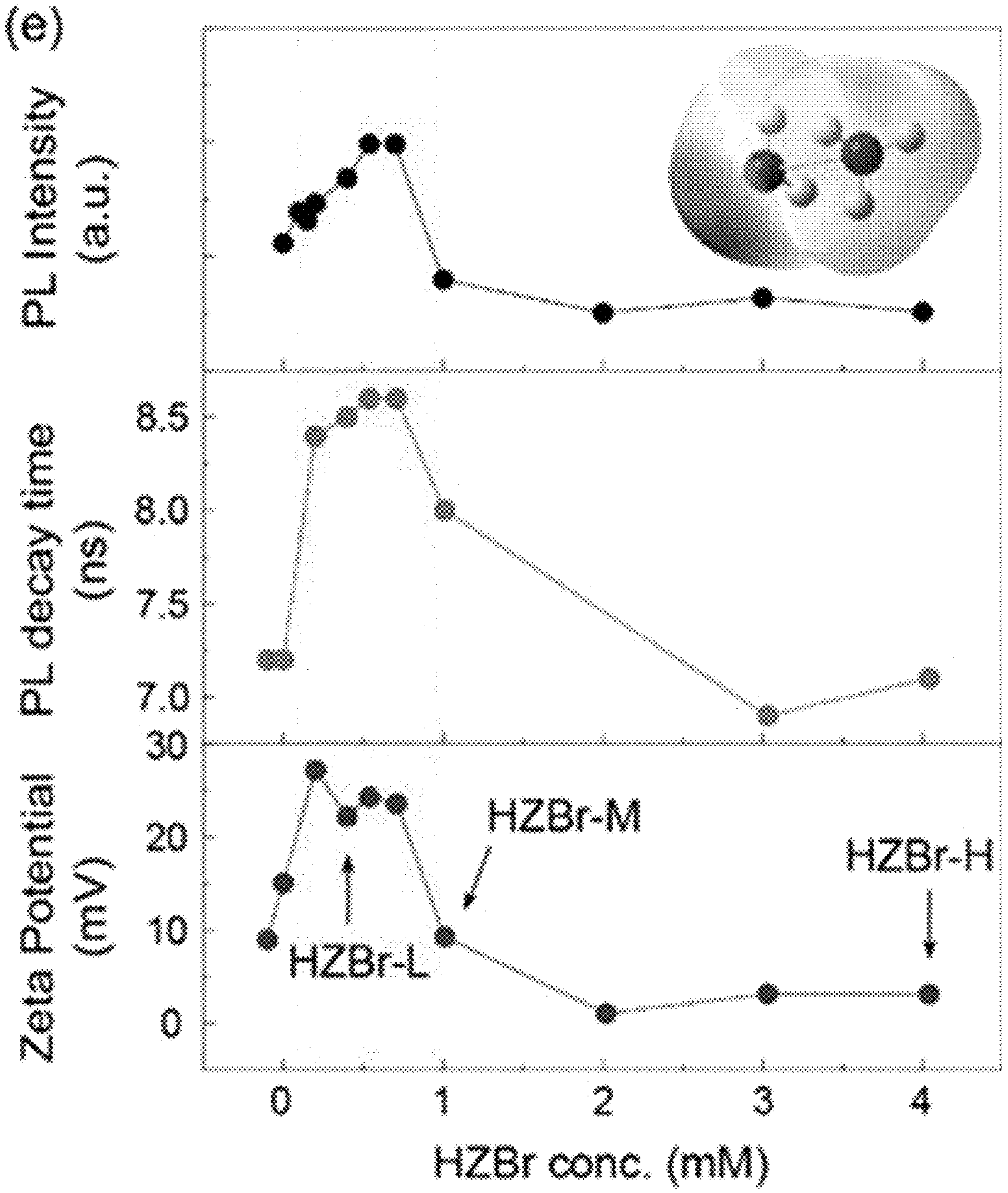
FIG. 5 is data showing the PL intensity, PL decay time, and zeta potential of $CsPbBr_3$ NCs according to the HZBr treatment concentration (0 to 4 mM)
Figure 6:
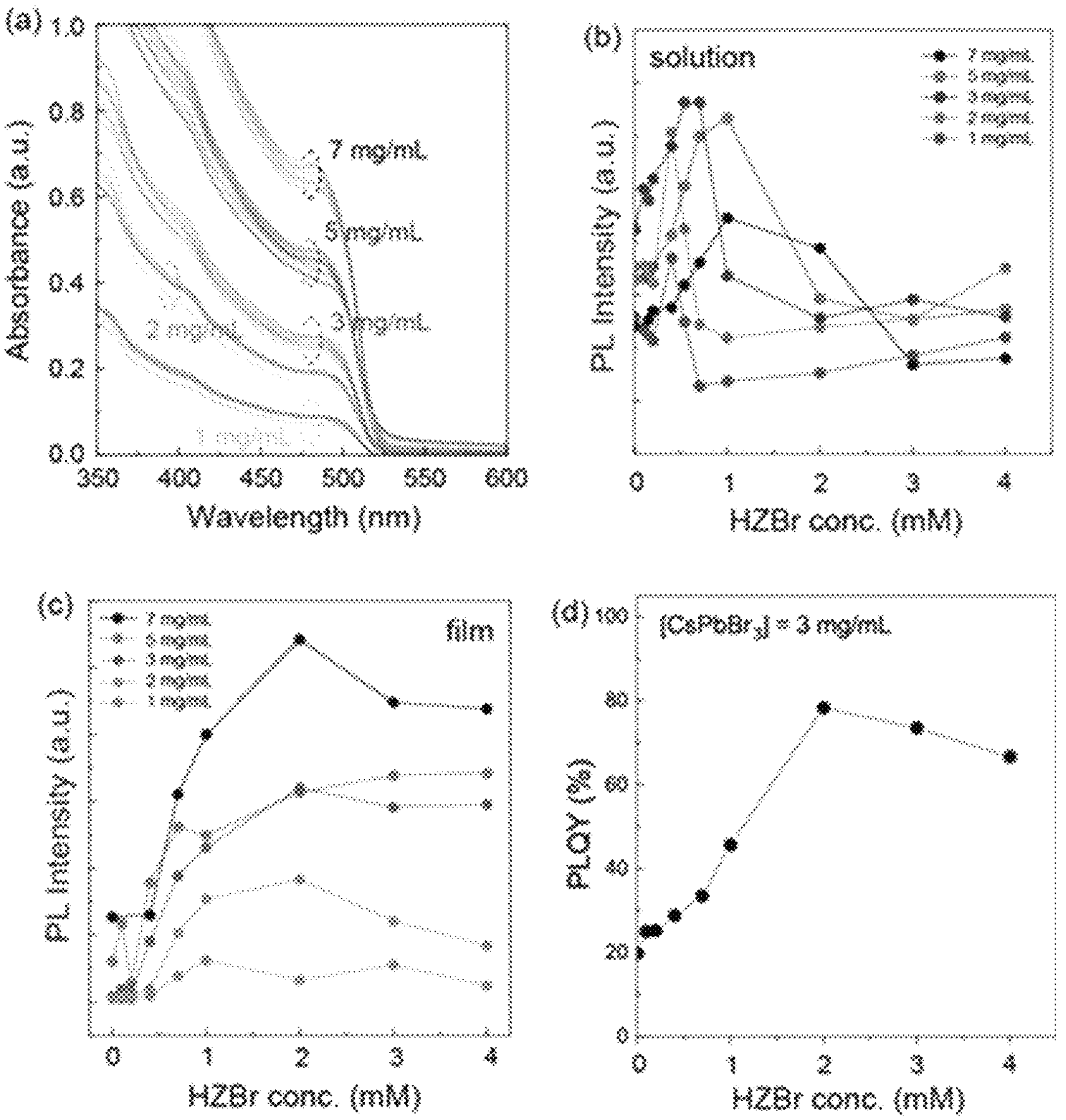
FIG. 6 shows (a) absorbance, (b) PL intensity of a solution, (c) PL intensity of a film, and (d) PLQY analysis data according to the HZBr treatment concentration (0 to 4 mM) and the content of $CsPbBr_3$ NCs.

To understand how the presence of HZBr affects PL emission and charge relaxation, the maximum PL intensity, PLQY, and decay time were observed for various HZBr concentrations (0 to 4 mM) (see FIGS. 5 and 6).

Referring to FIG. 5, both the PL intensity and decay time increased significantly when initially exposed to a low concentration of HZBr (<1 mM). This indicates that the addition of HZBr successfully improves the radiative recombination of the $CsPbBr_3$ NCs and that the hydrazinium ligand with a lower steric hindrance can be densely coordinated at the surface of the $[PbBr_6]^{4-}$ octahedral by replacing OlAm with a large steric hindrance. However, as the HZBr concentration increased, both values recovered to their initial levels with considerable aggregation of $CsPbBr_3$ NCs. By monitoring their absorbance and PL intensity, the concentration of the colloidal $CsPbBr_3$ NC solution was carefully controlled to be nearly identical to avoid possible effects such as the dilution-induced formation of nanoplates (NPLs) (FIG. 6).

To investigate the stability of colloidal dispersion during the HZBr resurfacing process, we measured the zeta potentials (ζ) of the $CsPbBr_3$ NCs depending on the HZBr concentration (FIG. 5). Initially, an abrupt increase in the positive value from +8 mV to +27 mV was observed for the HZBr-L, confirming the adsorption of $NH_2$-$NH_3^+$ ions and the stronger electrostatic repulsion on the NC surface. This suggests that the colloidal stability for film fabrication stems from increased surface charge density, despite considerably lower steric hindrance of short surface-bound ligands.

Figure 7:
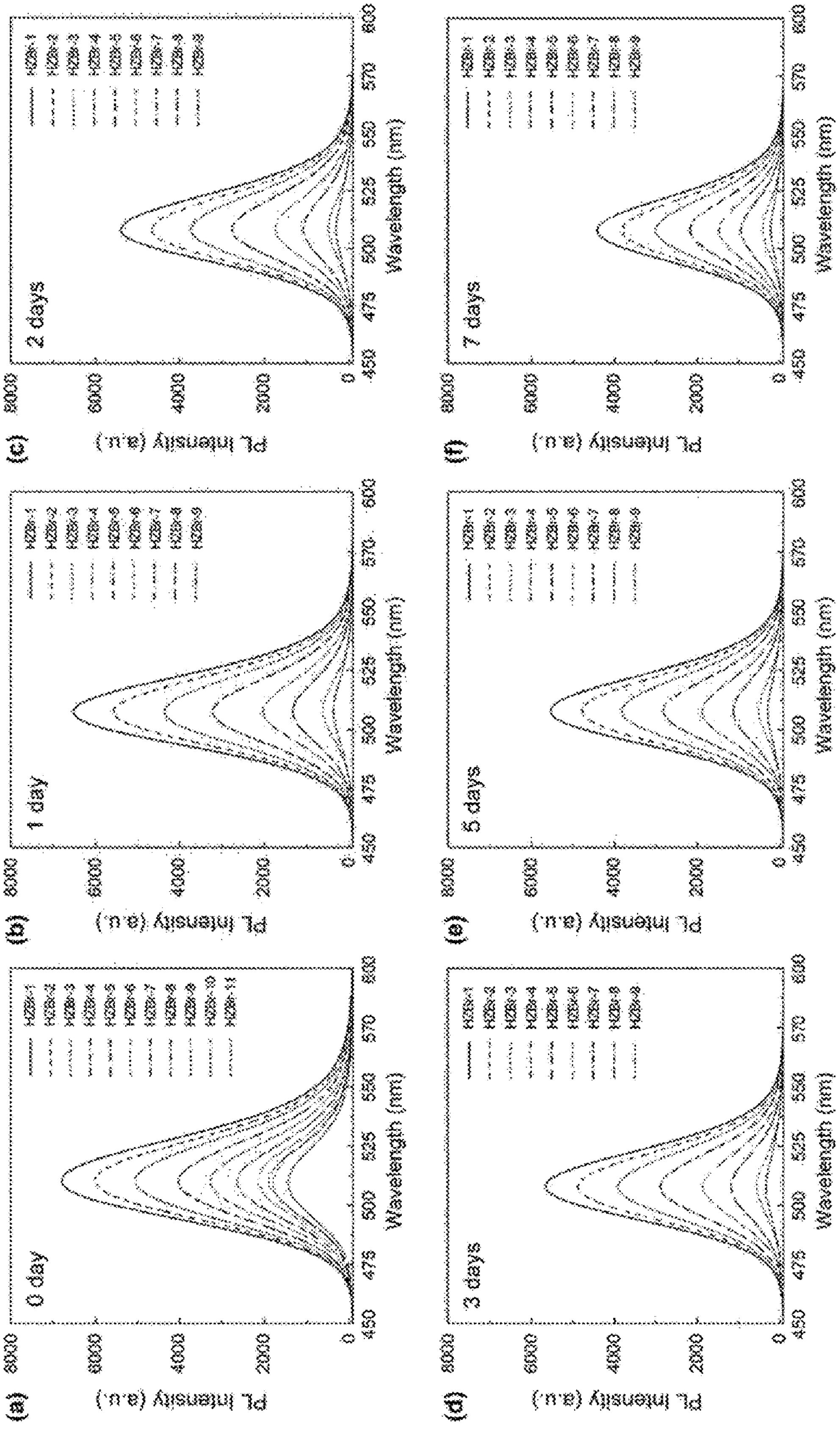
FIG. 7 is a PL intensity analysis result according to HZBr treatment concentration (0 to 4 mM) and aging time (0 to 7 days) after HZBr treatment.

In addition, the dispersion of HZBr-treated $CsPbBr_3$ NCs maintained the initial PL intensity and full-width half-maximum (FWHM) for more than one week, indicating relatively good long-term PL stability (FIG. 7). However, after the HZBr concentration increased above 1 mM (HZBr-M), it rapidly decreased to negligible values, indicating poor colloidal stability and aggregation. Therefore, optimized HZBr concentration is required to achieve a colloidal dispersion of the $CsPbBr_3$ NCs with the shell of HZBr ligands.

Figure 8:
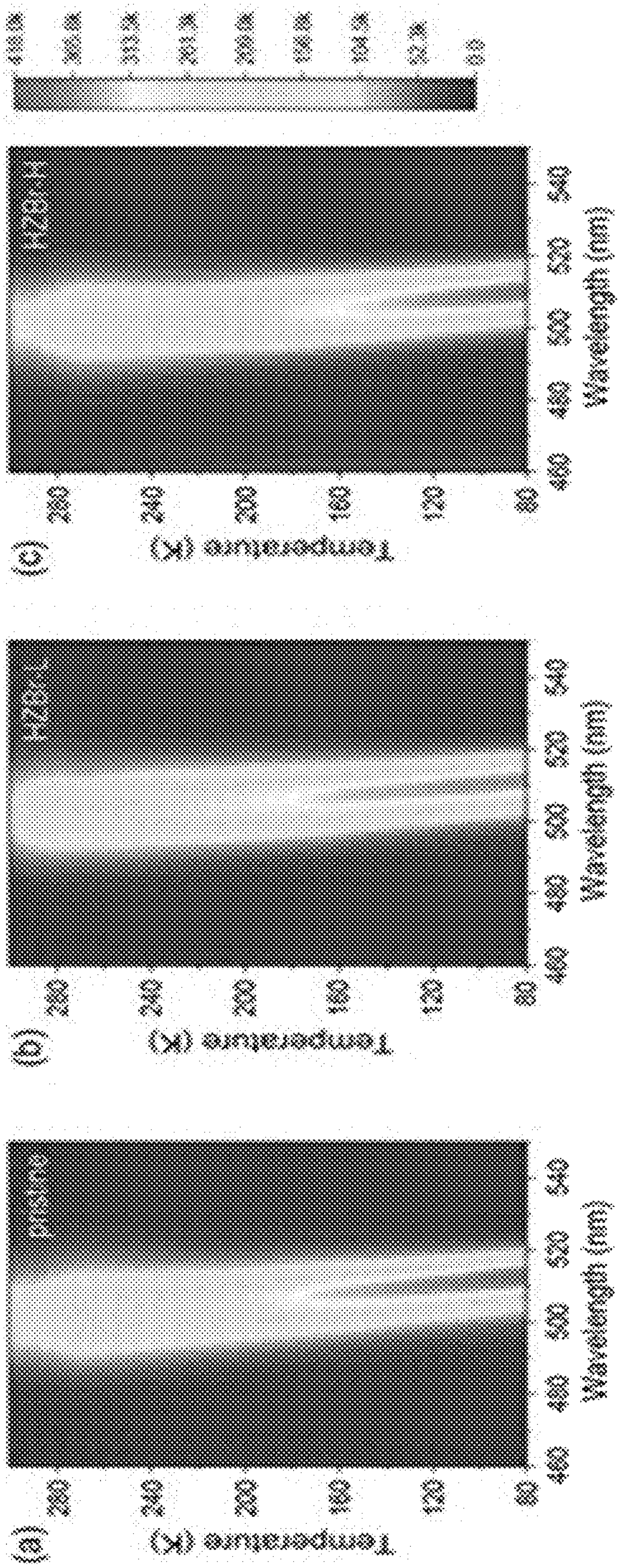
FIG. 8 shows 2D pseudocolor mapping data of temperature-dependent PL characteristics in a range of 80 K to 300 K for (a) pure $CsPbBr_3$ NC, (b) HZBr-L, and (c) $CsPbBr_3$ NC treated with 4 mM HZBr (HZBr-H)
Figure 9:
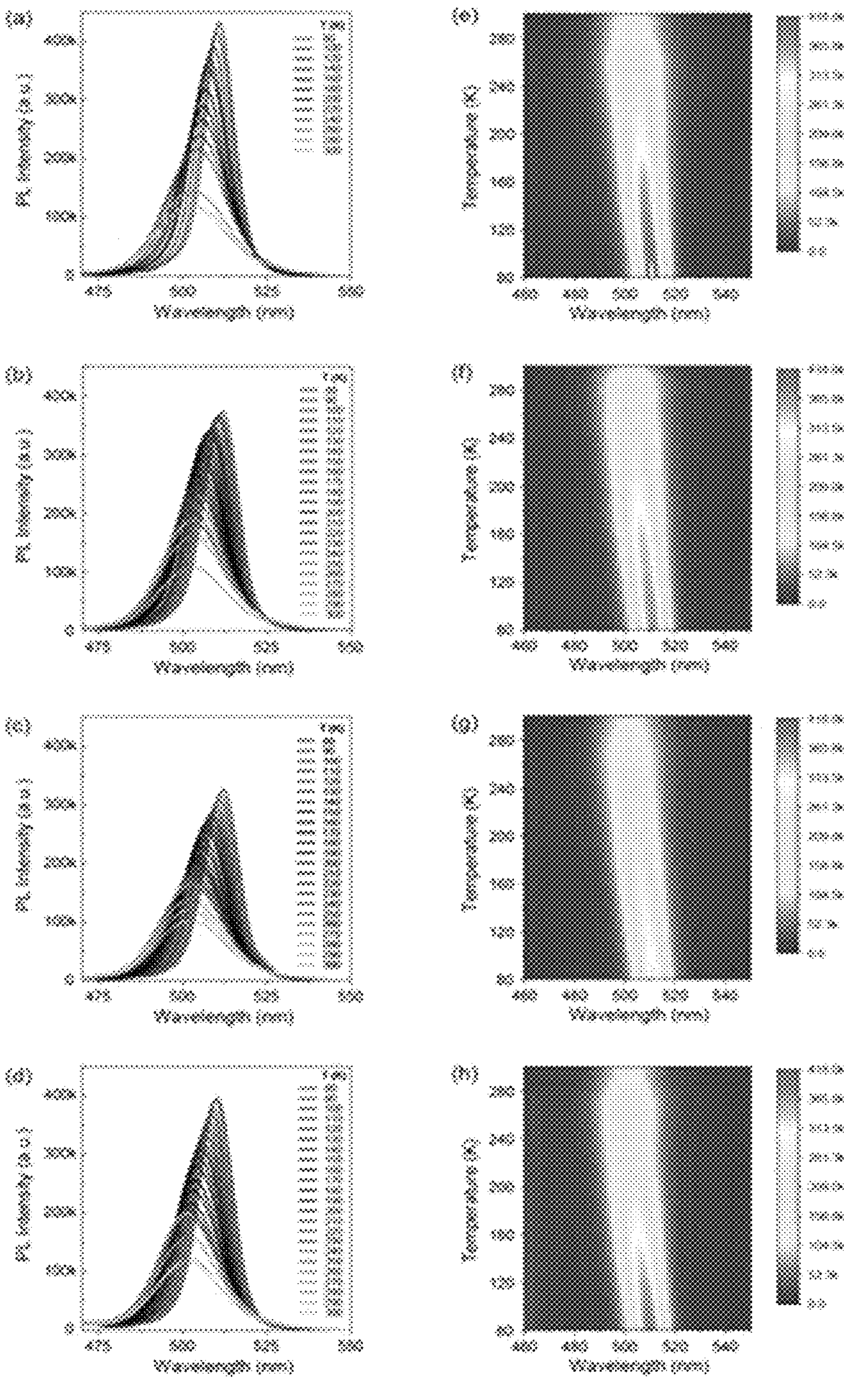
FIG. 9 shows temperature-dependent PL intensities in a range of 80 K to 300 K for (a, e) pure $CsPbBr_3$ NC, (b, f) HZBr-L, (c, g) $CsPbBr_3$ NC treated with 1 mM HZBr (HZBr-M), and (d, h) HZBr-H.
Figure 10:
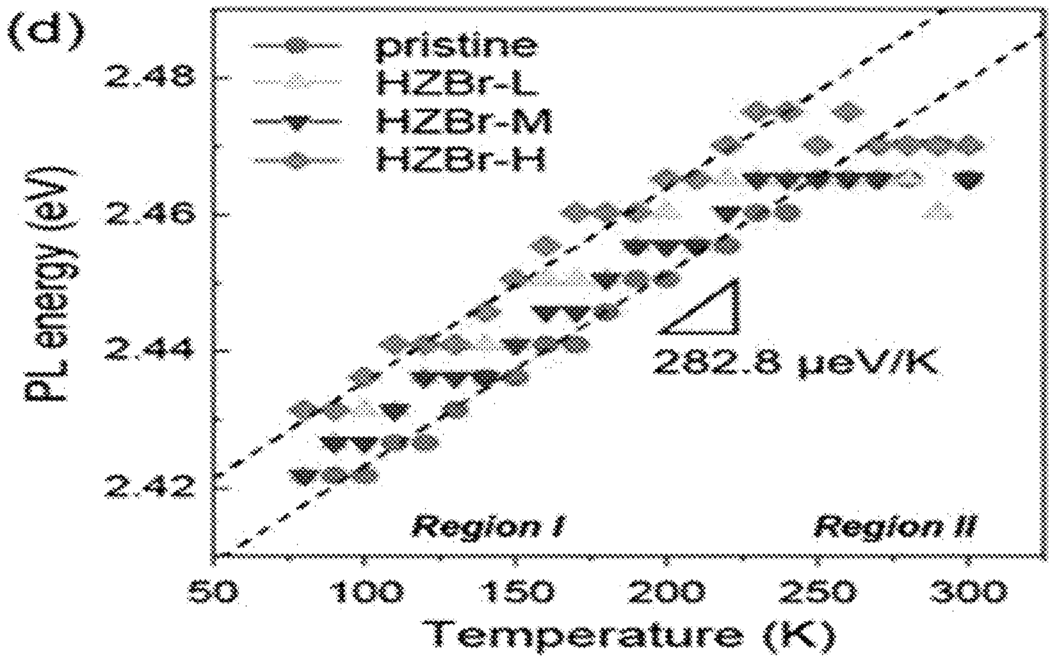
FIG. 10 shows PL energy spectra according to temperature of pure $CsPbBr_3$ NC, HZBr-L, HZBr-M, and HZBr-H, in which a dotted line is a linear fitting result for region I.

Cryogenic PL spectroscopic measurements were performed on HZBr-treated $CsPbBr_3$ NCs to elucidate exciton properties and exciton-phonon interactions based on the universal thermal expansion model (FIG. 8). For II-VI and III-V semiconductor quantum dots, red-shift of the PL peak wavelength can be observed with increasing temperature. This is due to the lattice deformation potential and exciton-phonon coupling, as described by an empirical Varshni relation. However, the 2-D pseudo-color plots of the temperature-dependent PL emission spectrum show a blue-shift and peak broadening as the temperature increases from 100 to 300 K for all samples (FIGS. 8 and 9). The PL peak energies exhibit a temperature dependence arising from the lattice thermal expansion and electron-phonon interaction. The increase in the bandgap energy indicates that the bandgap deformation potential is positive as the lattice expands at a higher temperature. The lattice expansion reduces the hybridization between the 4p orbital of Br and the 6s orbital of Pb, corresponding to the valence band maximum states of perovskite. The out-of phase band-edge states can be stabilized, increasing the bandgap energy. FIG. 10 shows that the PL energy can be approximated by a linear function with a slope of 282.8 μeV/K below 225 K (region I). However, it exhibits a sublinear behavior (region II) above 225 K, indicating the dominant role of the exciton-phonon coupling at higher temperatures.

Figure 11:
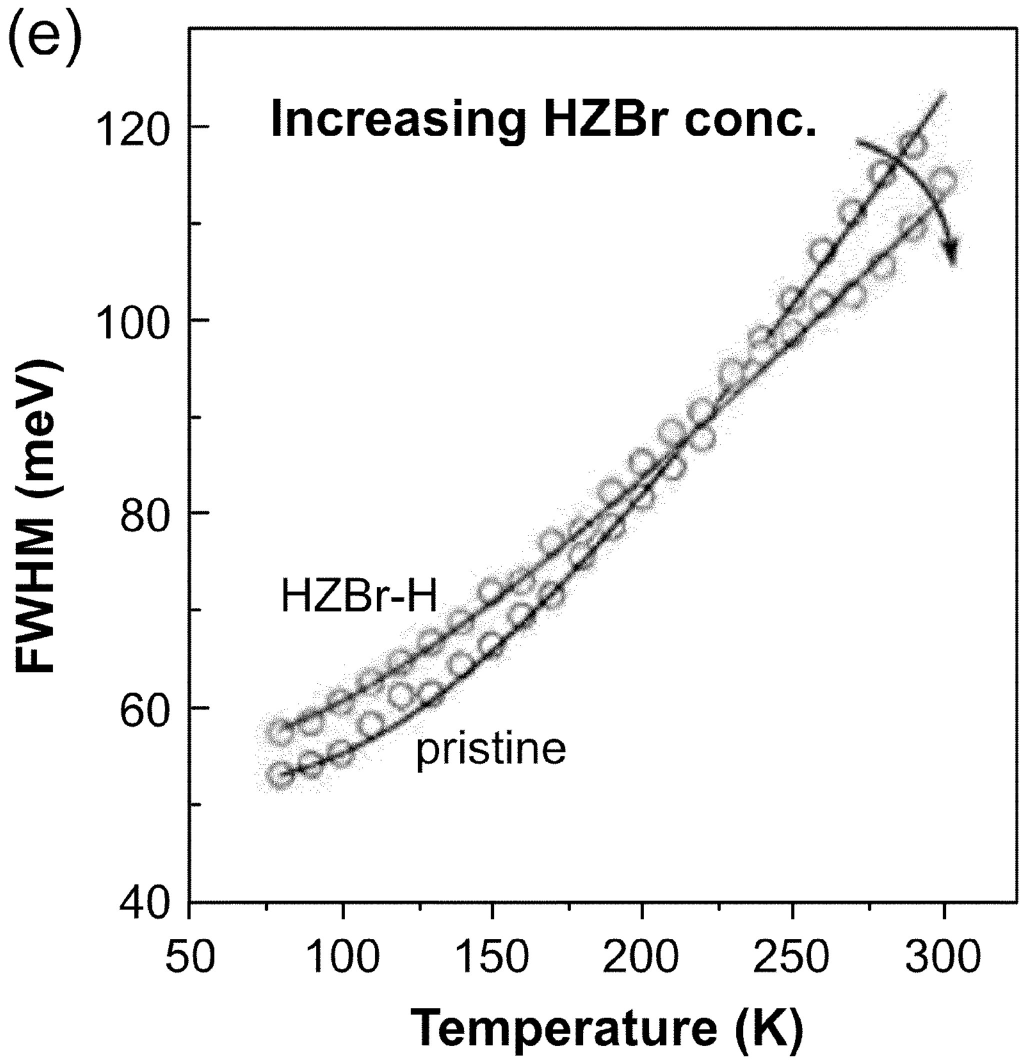
FIG. 11 shows full-width half-maximum (FWHM) energy values extracted from PL emission spectra of pure $CsPbBr_3$ NC (blue circles) and HZBr-H (red circles), according to temperatures.
Figure 12:
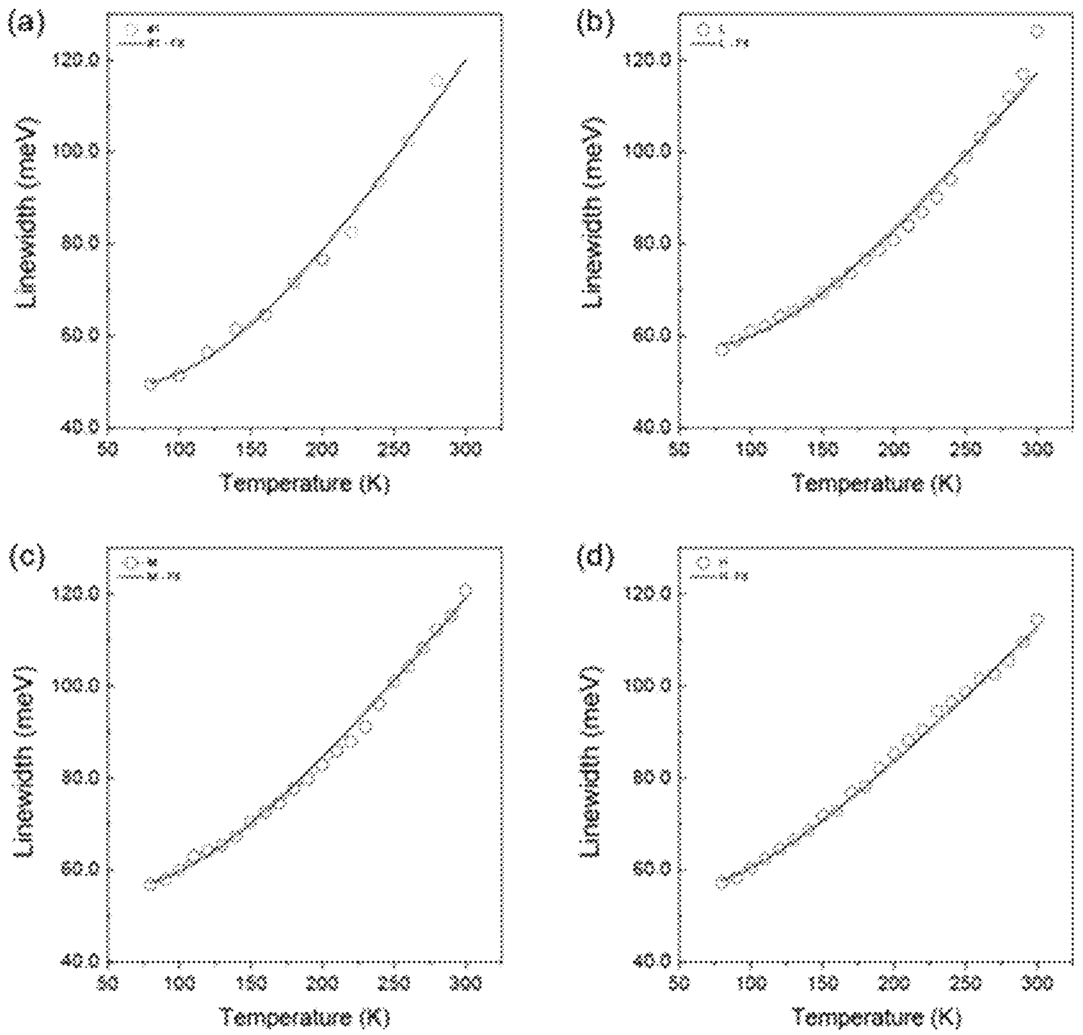
FIG. 12 shows full-width half-maximum (FWHM) energy values extracted from PL emission spectra of (a) pure $CsPbBr_3$ NC, (b) HZBr-L, (c) HZBr-M, and (d) HZBr-H according to temperatures.

The effect of HZBr treatment on the defect density on $CsPbBr_3$ NCs and on exciton-phonon coupling can be investigated by fitting temperature-dependent PL spectra. FIGS. 11 and 12 show the PL bandwidth of HZBr-treated $CsPbBr_3$ NCs as a function of temperature. The temperature dependence is attributable to phonons and exciton scattering using longitudinal optical (LO) phonons:

$$\Gamma(T) = \Gamma_{inh} + \Gamma_{AC}T + \Gamma_{LO}\left(e^{\hbar\omega_{LO}/k_BT} - 1\right)^{-1} \tag{1}$$

where $\Gamma_{inh}$ is the temperature-independent inhomogeneous line width arising from variation of NC size, shape, and composition, as well as the scattering process associated with disorder and imperfections of the lattice, $\Gamma_{AC}$ is the exciton acoustic phonon coupling coefficient, $k_B$ is the Boltzmann constant, $\Gamma_{LO}$ is the exciton-LO phonon coupling coefficient, and $\hbar\omega_{LO}$ is the LO phonon energy.

Figure 13:
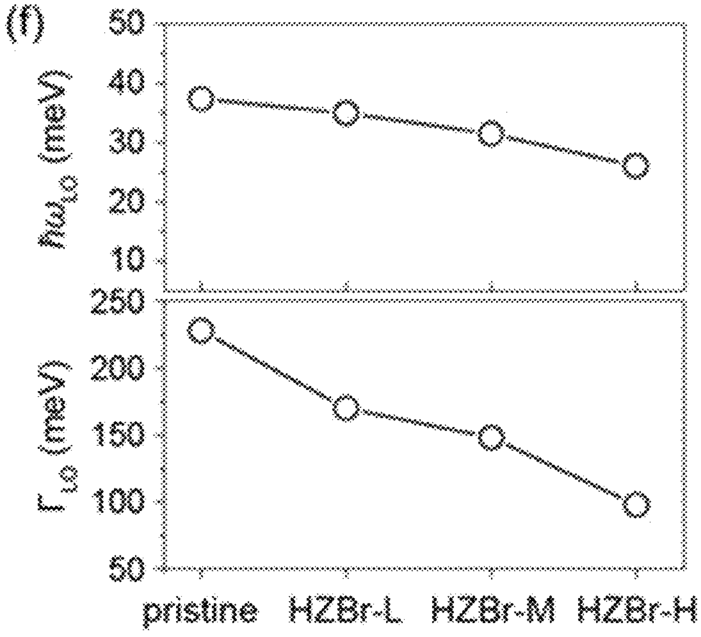
FIG. 13 is analysis data of longitudinal optical (LO) phonon energy (top) and exciton-LO phonon coupling coefficient (bottom) extracted from FIG. 12.

The linear $\Gamma_{AC}$ component dominates when the temperature is lower than 75 K (T<75 K) due to low-energy acoustic phonons, whereas the LO phonon energy ($\Gamma_{LO}$) component is significant when the temperature is higher than 75 K (T>75 K) dominated by Bose-Einstein statistics. The extracted values of $\hbar\omega_{LO}$ and $\Gamma_{LO}$ are shown in FIG. 13 and Table 1 below.

TABLE 1

| | Pure $CsPbBr_3$ | HZBr-L | HZBr-M | HZBr-H |
|---|---|---|---|---|
| $\Gamma_{inh}$ | 51.5 | 56.5 | 55.2 | 55.0 |
| $\sigma$ | 0.005 | 0.005 | 0.005 | 0.005 |
| $\Gamma_{LO}$ | 228.1 | 170.0 | 148.2 | 97.8 |
| $E_{LO}$ | 37.4 | 35.0 | 31.5 | 26.1 |

$\hbar\omega_{LO}$ is 37.4 meV for pristine $CsPbBr_3$ and decreases slightly to 26.1 meV (HZBr-H) with increasing HZBr concentration. These values are in a range of from 15.5 to 52.4 meV for $CsPbBr_3$ NCs and are consistent with the results of previous studies. Meanwhile, Two significantly decreases 97.8 meV from $\Gamma_{LO}$=228.1 meV with increasing HZBr concentration, suggesting that the contribution of exciton-LO phonon coupling to the broadening of PL becomes weaker. Similarly, the (3-aminopropyl)triethoxysilane ligands of $CsPbBr_3$ NCs act as a mechanical damper and inhibits lattice vibrations, resulting in weak exciton-phonon coupling strength. This shows that the hydrazinium ligands coordinated on the surface of the $[PbBr_6]^{4-}$ octahedron effectively suppress the formation of permanent and transient exciton traps by reducing the exciton-LO phonon coupling on the surface of $CsPbBr_3$ NCs.

The localization depth of excitons associated with non-radiative processes on the surface of NCs can be estimated from the temperature dependence of the integrated PL intensity as represented by the following equation:

$$I(T) = I_0\left(1 + Ae^{-\Delta E_{trap}/k_BT}\right)^{-1} \quad (2)$$

where $I_0$ is the integrated PL intensity at T=0 K, $\Delta E_{trap}$ is the activation energy for carrier trapping, and A is the frequency factor related to the trap state.

Figure 14:
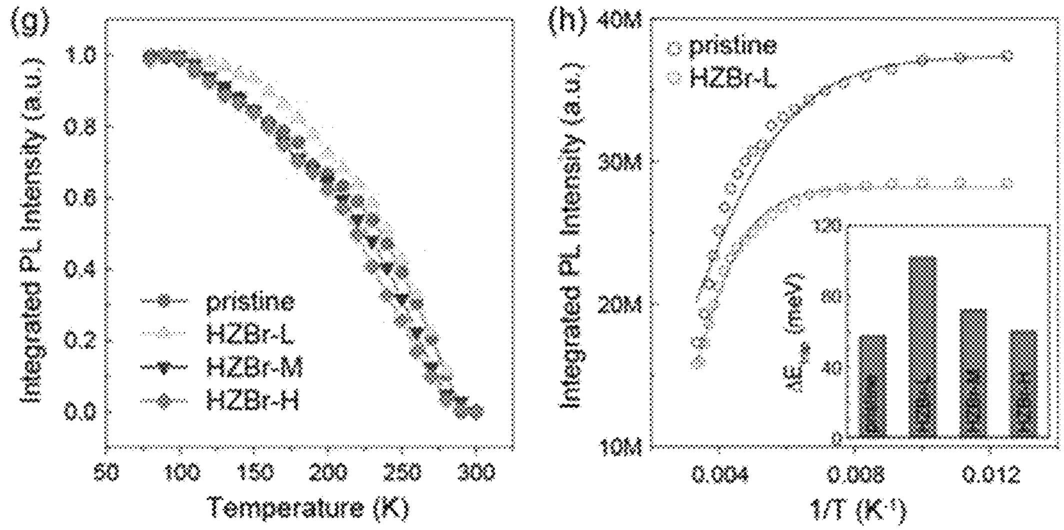
FIG. 14 shows integrated PL intensity analysis data according to temperature of pure $CsPbBr_3$ NC, HZBr-L, HZBr-M, and HZBr-H, and integrated PL intensity analysis according to 1/T of pure $CsPbBr_3$ NC and HZBr-L, in which a circle represents experimental results, and a line represents fitting results; The inset of FIG. 14 (right) represents $\Delta E_{trap}$ value determined by the fitting curve.
Figure 15:
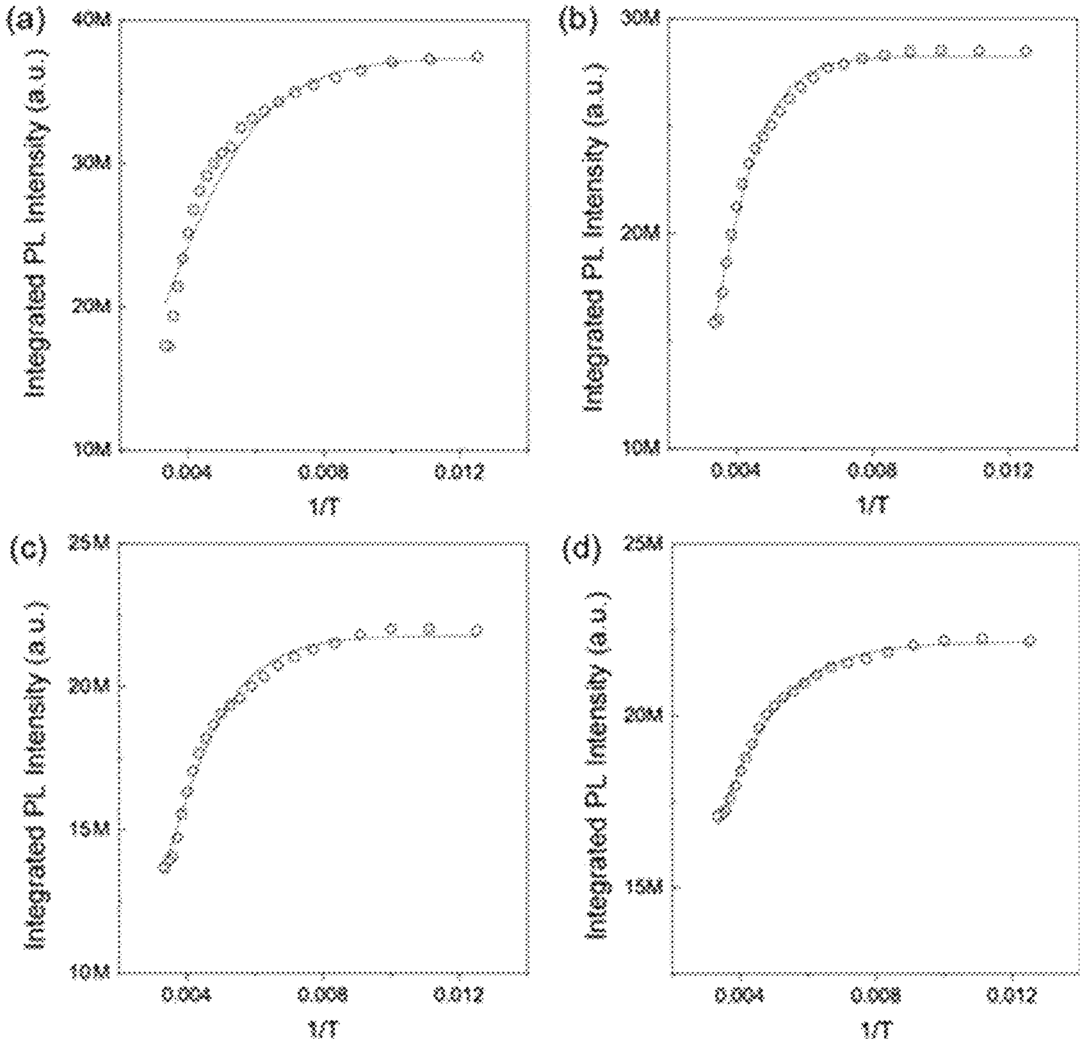
FIG. 15 shows integrated PL intensity analysis data according to 1/T of (a) pure $CsPbBr_3$ NC, (b) HZBr-L, (c) HZBr-M, and (d) HZBr-H, in which a circle represents experimental results, and a line represents fitting results.

The normalized PL area as a function of temperature is shown along with the fitting curves associated with FIGS. 14 and 15. FIG. 14 clearly shows that HZBr-L exhibits reduced thermal quenching properties compared to pristine $CsPbBr_3$. The $\Delta E_{trap}$ value determined by the fitting curve is the same as the inset value in FIG. 14. For pristine $CsPbBr_3$, the trapping activation energy is 57.4 meV, which is comparable to the value for the shallow state of the Br vacancy. In addition, the PL quenching process with an activation energy of about 30 meV is usually observed through a transition between intrinsic and shallow defect states. Interestingly, in the case of HZBr-L, the $\Delta E_{trap}$ value increased to 101.9 meV, indicating that the surface Br vacancies and related defect states were well passivated. After HZBr treatment, an increase in the relative Br/Cs atomic ratio was also confirmed by X-ray photoelectron spectroscopy (XPS) analysis, and it will be more clearly described later.

Figure 16:
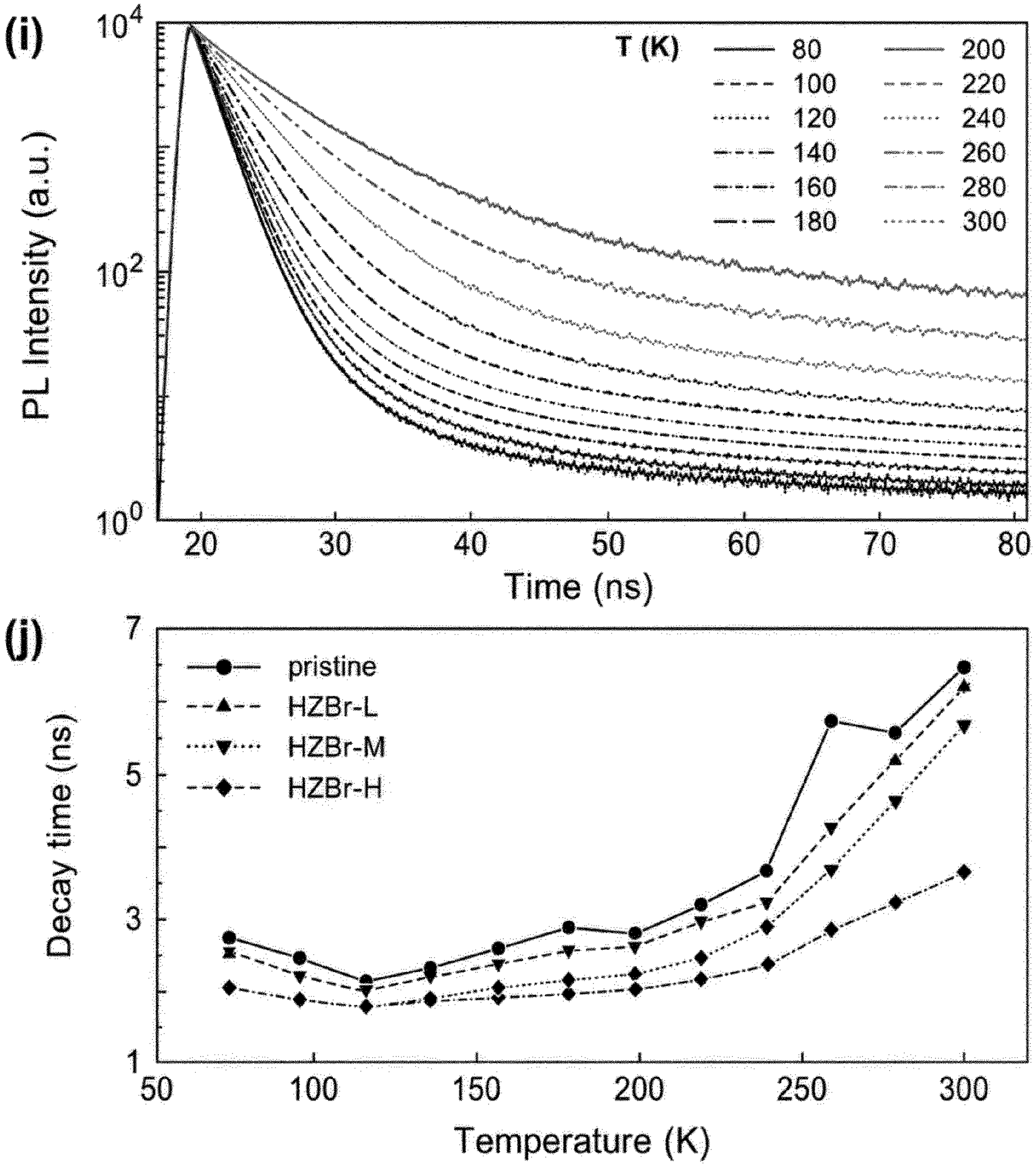
FIG. 16 shows time resolved PL (TRPL) spectra of HZBr-L (top) and PL decay times of pure $CsPbBr_3$ NC, HZBr-L, HZBr-M, and HZBr-H (bottom)
Figure 17:
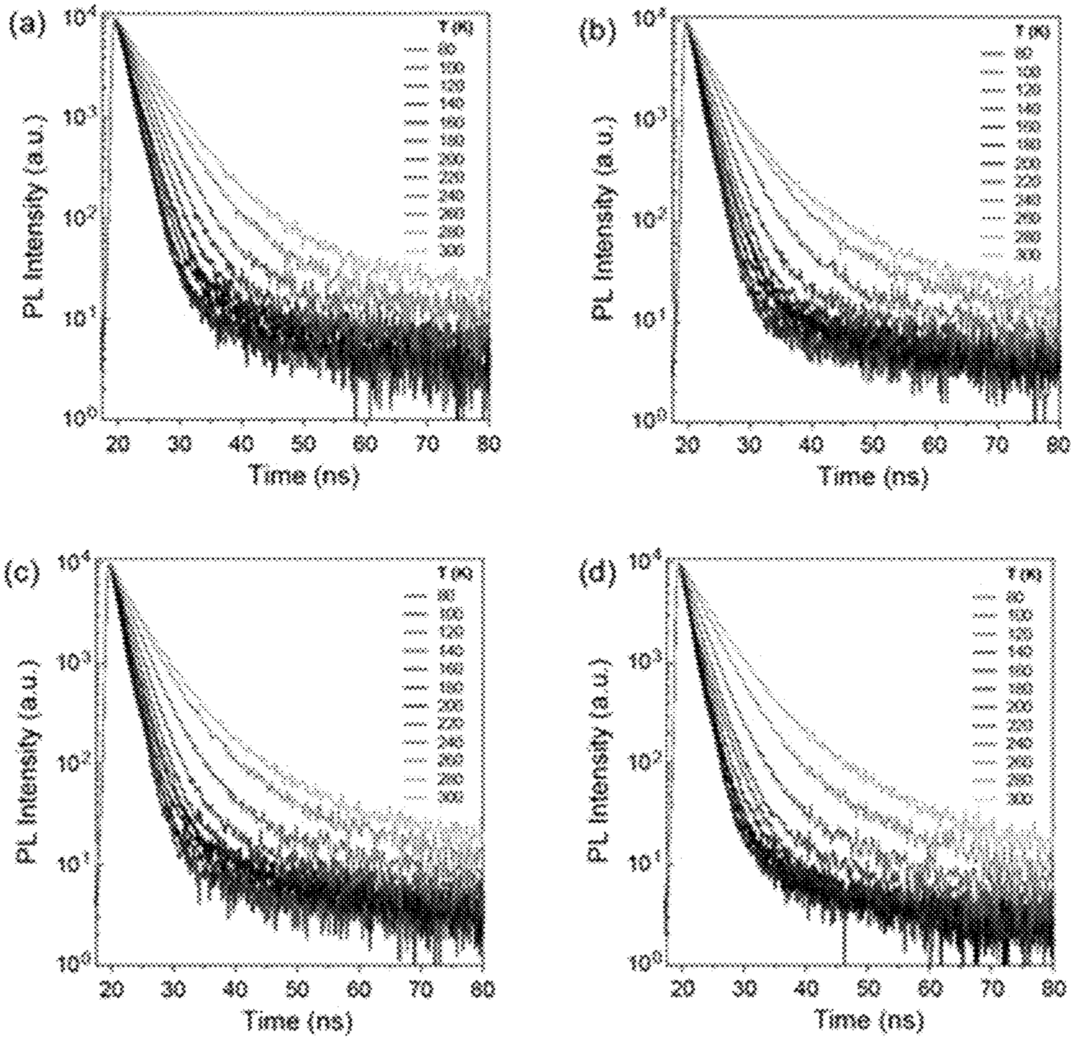
FIG. 17 shows TRPL spectra according to temperature of (a) pure $CsPbBr_3$ NC, (b) HZBr-L, (c) HZBr-M, and (d) HZBr-H.

Time-resolved PL (TRPL) decay curves were obtained to understand carrier recombination dynamics depending on the temperature (FIGS. 16 and 17). The PL lifetime increased monotonically for all samples as the temperature increased from 80 K to 300 K. The short PL lifetime at low temperatures indicates that free excitons are efficiently captured by trap states. The prolonged carrier decay process at higher temperatures is attributable to exciton thermal dissociation which hinders recombination.

Transmission electron microscope (TEM) images and atomic force microscope (AFM) images were obtained to investigate the surface characteristics of a film of $CsPbBr_3$ NCs according to HZBr treatment (FIGS. 18 to 20 and 22).

Figure 18:
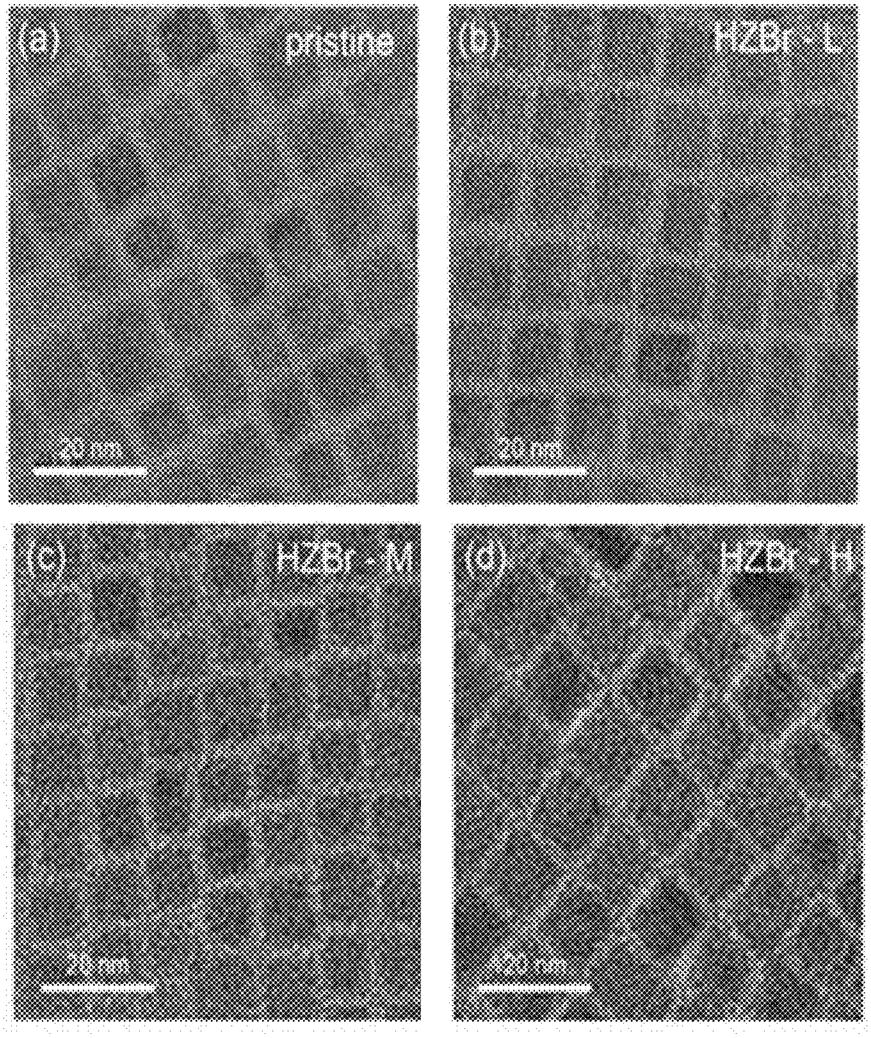
FIG. 18 shows TEM images of (a) pure $CsPbBr_3$ NC, (b) HZBr-L, (c) HZBr-M, and (d) HZBr-H.
Figure 19:
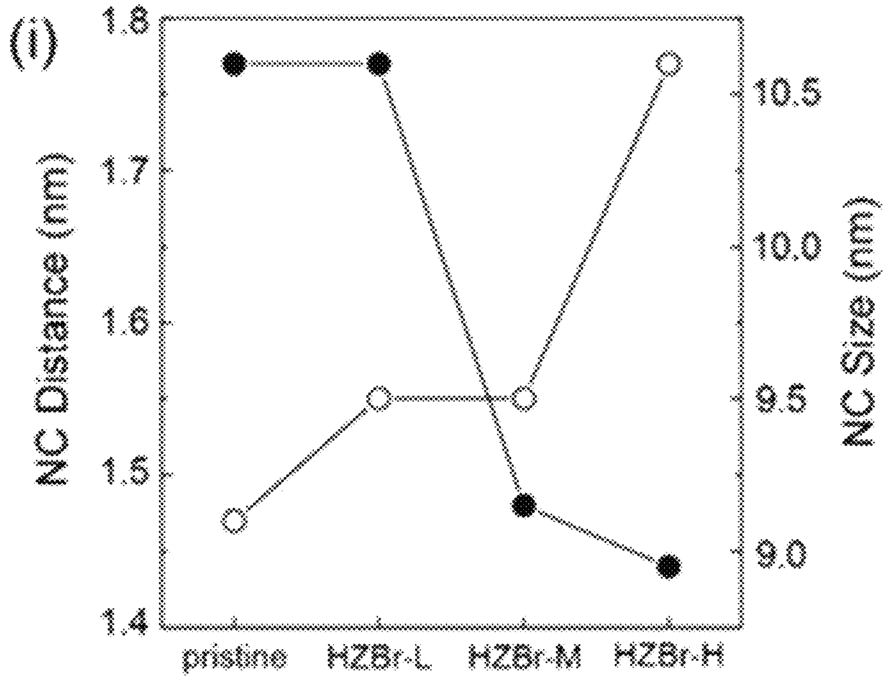
FIG. 19 is graph showing the particle size and interparticle distance of nanocrystal particles of pure $CsPbBr_3$ NC, HZBr-L, HZBr-M, and HZBr-H.
Figure 20:
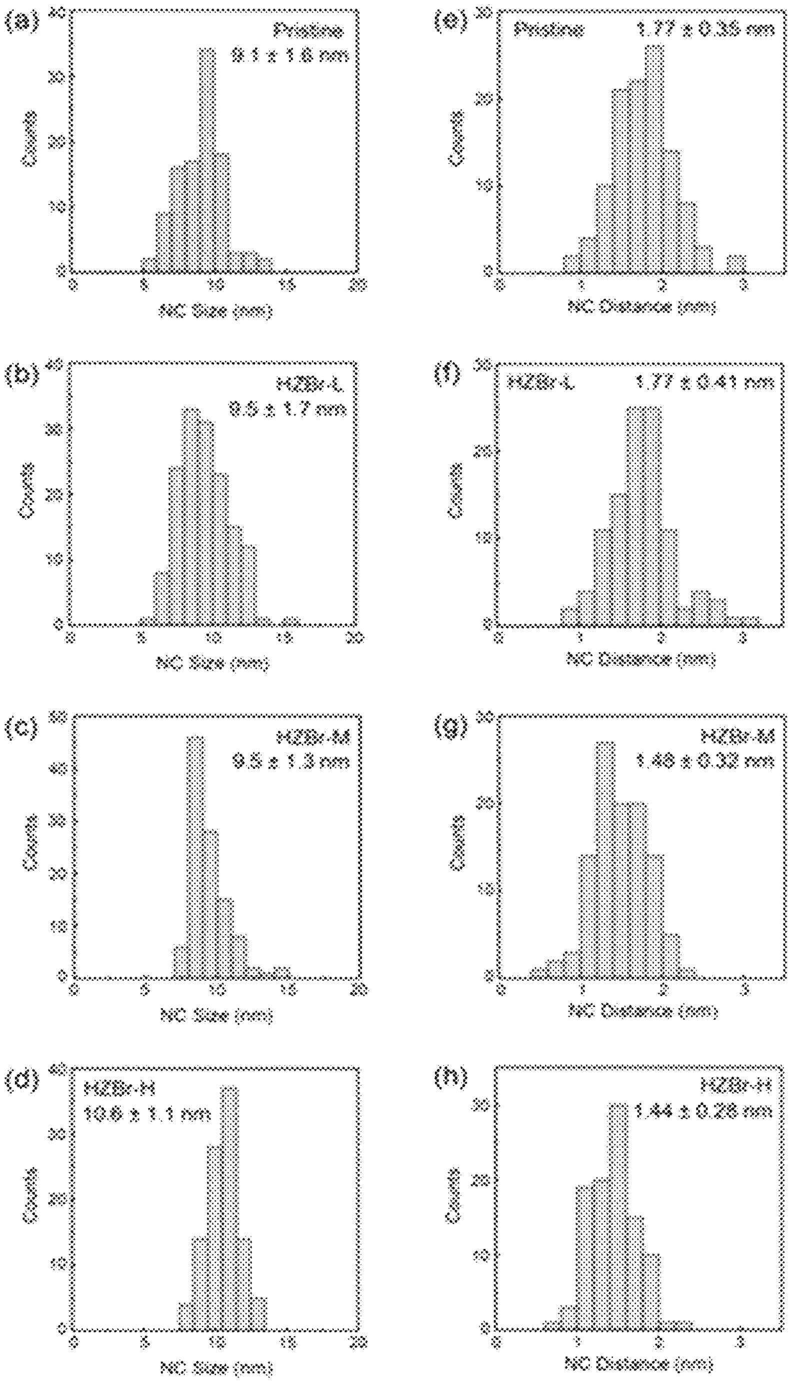
FIG. 20 shows analysis data of the particle size and interparticle distance of (a, e) pure $CsPbBr_3$ NC, (b, f) HZBr-L, (c, g) HZBr-M, and (d, h) HZBr-H.

FIG. 18 shows TEM images of $CsPbBr_3$ NCs treated with various concentrations of HZBr. While the overall square shape of the NCs was maintained, the size slightly increased from 9.2 nm to 10.6 nm. The interparticle distance decreased from about 1.8 nm to 1.4 nm as the concentration of HZBr increased (FIGS. 19 and 20). It is postulated that further growth to maintain the chemical potential of NCs in the solution medium occurs due to redissolution of the exfoliated $[PbBr_6]^{4-}$ octahedra in the presence of excess HZBr. The partial size reduction of $CsPbBr_3$ NCs is confirmed on the basis of the blue shift of the PL peak energy, which is exhibited by $CsPbBr_3$ NCs when exposed to HZBr (FIG. 10) because this often leads to such quantum confinement effects in PL spectra.

Figure 21:
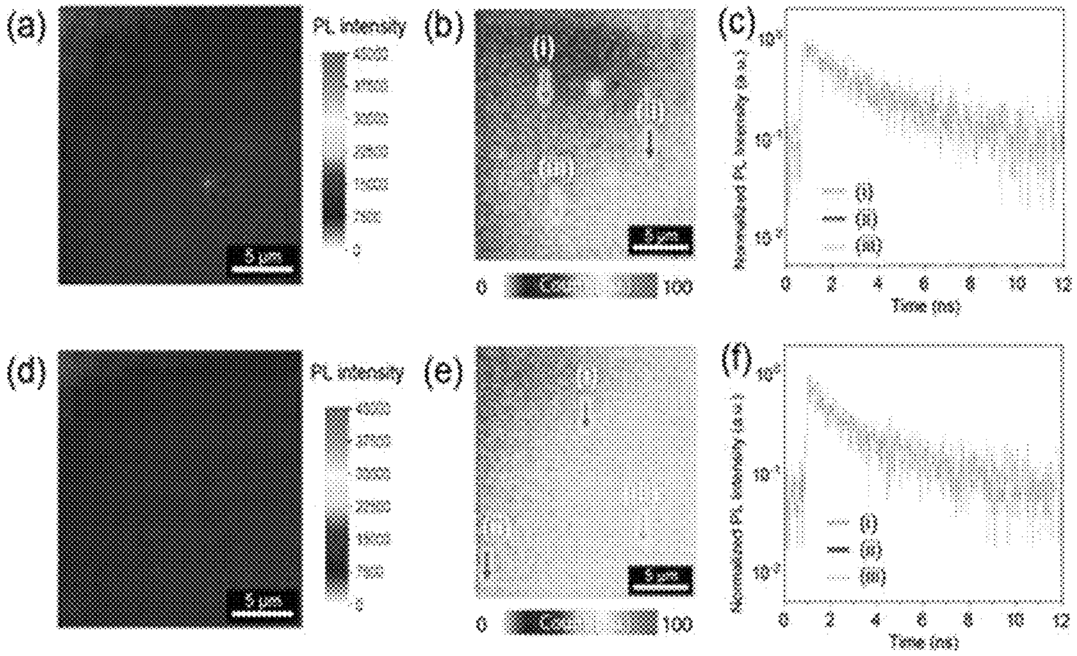
FIG. 21 shows PL (a, d), TRPL mapping (b, e), and TRPL spectra (c, f), in which a to c represent data for pure $CsPbBr_3$ NC films and d to f represent data for HZBr films.
Figure 22:
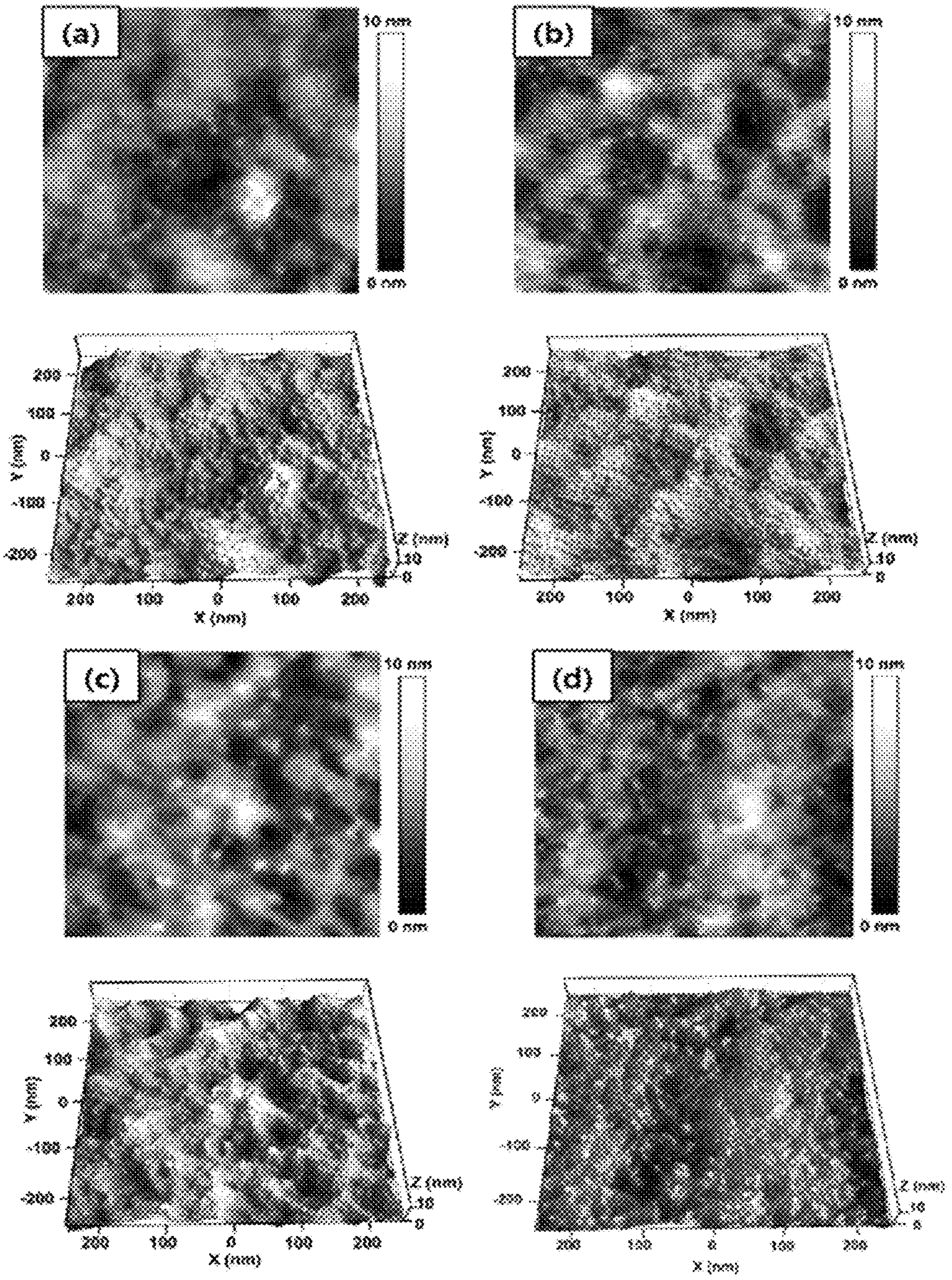
FIG. 22 shows AFM topography images (500×500 $nm^2$, height contrast (top), 3D image (bottom)) of (a) pure $CsPbBr_3$ NC, (b) HZBr-L, (c) HZBr-M, and (d) HZBr-H.
Figure 23:
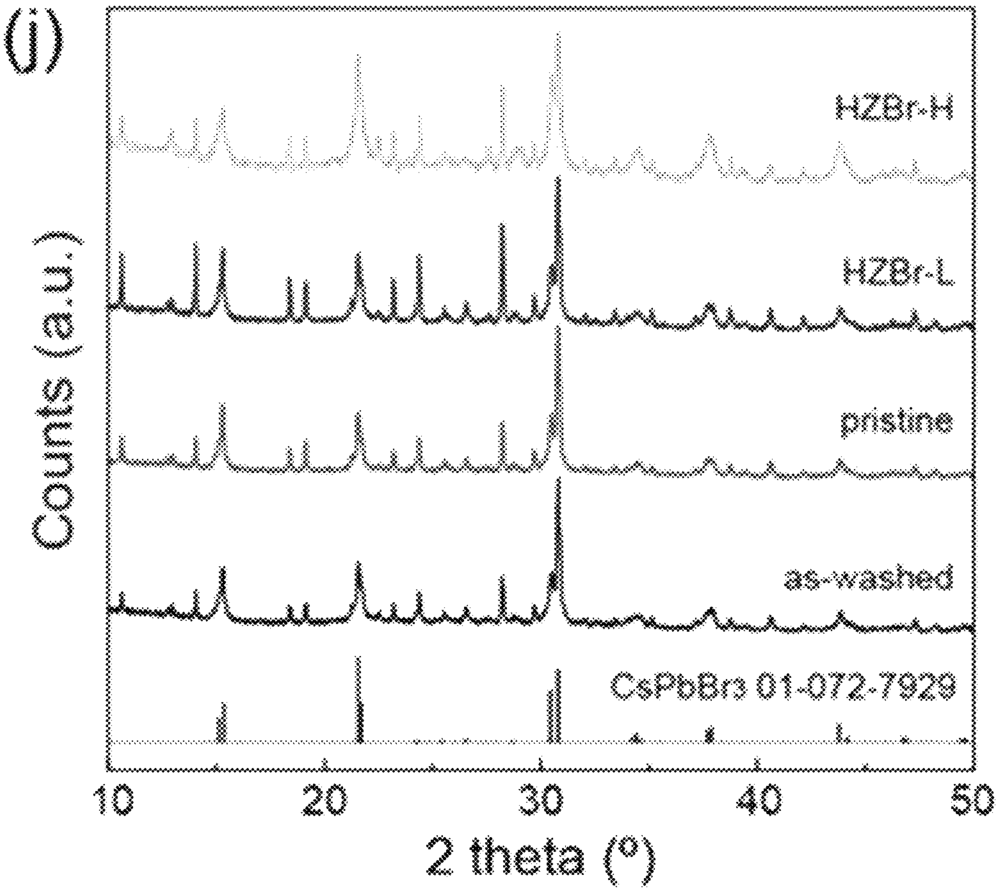
FIG. 23 is X-ray diffraction pattern (XRD) analysis data of pure $CsPbBr_3$ NC, HZBr-L, HZBr-M, and HZBr-H.

Uniform PL emission and lifetime of the $CsPbBr_3$ nanocrystalline film were confirmed from images obtained by PL and TRPL mapping (FIG. 21). The corresponding AFM images show the surface topology of the uniform NC film with low root mean square roughness ($R_q$) of 2.384, 2.230 nm, 2.253 nm, and 2.067 nm for pristine $CsPbBr_3$, HZBr-L, HZBr-M, and HZBr-H, respectively (FIG. 22). XRD patterns show that all NCs have a well-defined orthorhombic $CsPbBr_3$ phase (PDF #01-072-7929) with a space group of Pnma (a=8.165, b=8.425, c=12.011 Å) (FIG. 23).

Figure 24:
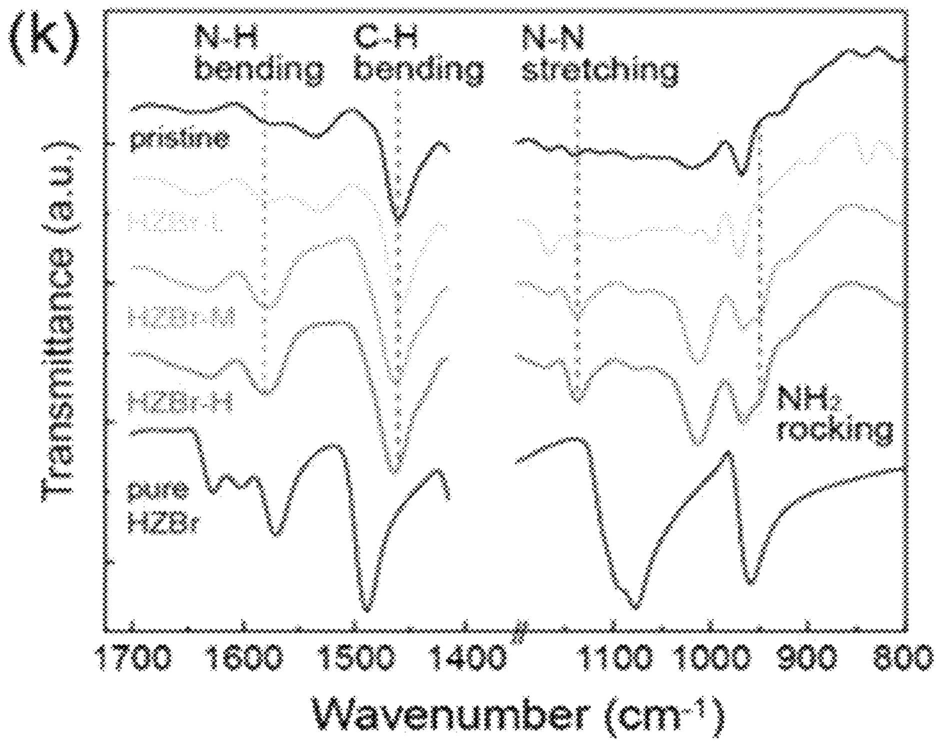
FIG. 24 is FT-IR analysis data of pure $CsPbBr_3$ NC, HZBr-L, HZBr-M, and HZBr-H.

The presence of $NH_2$-$NH_3^+$ ions was confirmed through Fourier Transform Infrared Spectroscopy (FT-IR) (FIG. 24). Upon exposure to HZBr, $CsPbBr_3$ NCs clearly exhibited an evolution of the rocking $\nu_1$ ($NH_2$) at 951 $cm^{-1}$, the stretching $\nu_2$ (N—N) at 1138 $cm^{-1}$, and the bending $\nu_3$ (N—H) at 1577 $cm^{-1}$. In particular, a significant shift of the N—N stretching mode ($\nu_2$) to a higher wavenumber was observed while the $NH_2$ rocking and the N—H bending modes ($\nu_1$ and $\nu_3$) showed a minimal peak shift compared to the pure HZBr. In addition, unlike pristine $CsPbBr_3$ that exhibits an $NH_2$ rocking at 970 $cm^{-1}$ in HZBr and OlAm, the HZBr-treated sample exhibited an additional $NH_2$ rocking $\nu_1$ at 951 $cm^{-1}$. The origin of the shift in the vibrational band can be linked to the weaker vibrational motion of $NH_2$-$NH_3^+$ ions when they strongly interact with the surface coordination sites of the $CsPbBr_3$ NCs. This suggests that the addition of an appropriate amount of HZBr effectively passivates and stabilizes the surface of the $CsPbBr_3$ NCs.

Figure 25:
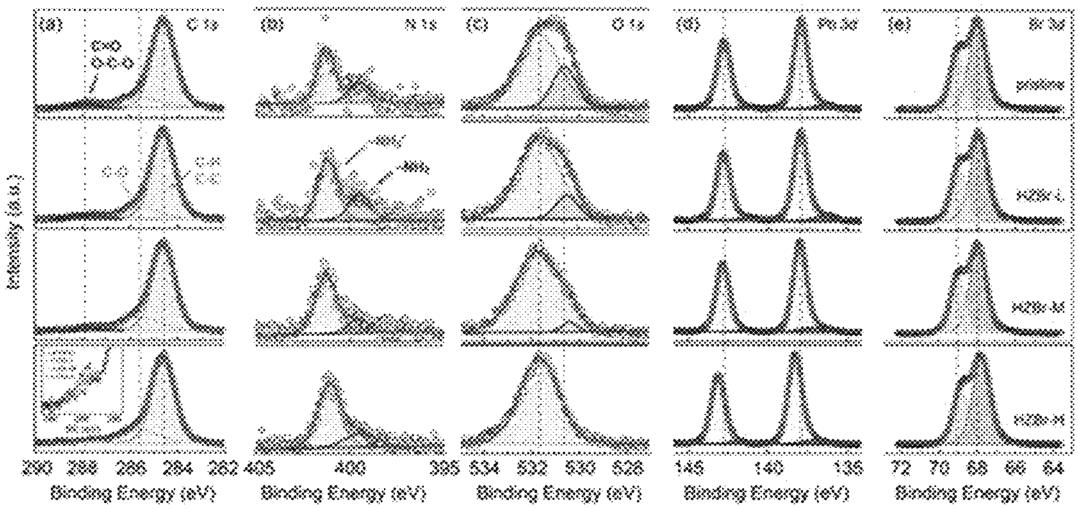
FIG. 25 shows XPS analysis of (a) C 1s, (b) N 1s, (c) O 1s, (d) Pb 3d, and (e) Br 3d of pure $CsPbBr_3$ NC, HZBr-L, HZBr-M, and HZBr-H.

The unique properties of $CsPbBr_3$ NCs are closely related to the chemical reaction with the surface containing the $[PbBr_6]^{4-}$ octahedron composed $CsPbBr_3$ NCs, $Pb^{2+}$ ions, and $Br^-$ vacancies when HZBr is added. The surface chemistry of $CsPbBr_3$ NCs was further investigated by XPS. FIG. 25 shows a representative high-resolution XPS spectrum of $CsPbBr_3$ NCs treated with HZBr. The C 1s spectrum of pristine $CsPbBr_3$ shows prominent shoulder peaks at 287.9 (O═C—O) and 285.6 eV (C—O). This indicates that organic ligands such as oleic acid are present on the surface of $CsPbBr_3$ NCs ((a) of FIG. 25). However, the shoulder peak at 287.9 eV (O═C—O) completely disappeared as the HZBr concentration increased, suggesting that the HZBr treatment could effectively reduce the amount of oleic acid (inset, (a) in FIG. 25). Similarly, well-resolved signals corresponding to —$NH_3^+$ (401.2 eV) and —$NH_2$ (398.6 eV) were observed from the XPS spectrum of N 1s ((b) in FIG. 25). After the HZBr treatment, the N 1s peak corresponding to a protonated amine group (—$NH_3^+$) is dominated by a sub-peak (—$NH_2$) that is negligible at a lower binding energy (398.6 eV). This indicates the presence of $NH_2$-$NH_3^+$ ions on the surface of $CsPbBr_3$ NCs. These results confirm that relatively short $NH_2$-$NH_3^+$ ions replace relatively long hydrocarbon chains. In the O 1s spectrum of pristine $CsPbBr_3$, an additional shoulder peak appeared at 530.7 eV due to the 0-Pb bond, but the shoulder peak significantly decreased as the HZBr concentration increased ((c) in FIG. 25). These results indicate that HZBr can successfully promote the surface reorganization by dissociating $Pb^{2+}$—$RCOO^-$ and forming $Pb^{2+}$—$Br^-$ coordination, resulting in exfoliation of surface-bound ligands. On the other hand, the amine groups (—$NH_2$) having a line pair of electrons, of $NH_2$-$NH_3^+$ ions can preferentially coordinate with uncoordinated Pb atoms, thereby electrostatically stabilized $CsPbBr_3$ NCs consistent with zeta potential measurements (FIG. 5). However, it should be noted that excessive amounts of HZBr (i.e., HZBr-M and HZBr-H) can severely etch the surface of $CsPbBr_3$ NCs, resulting in poor colloidal dispersion of the aggregates.

Figure 26:
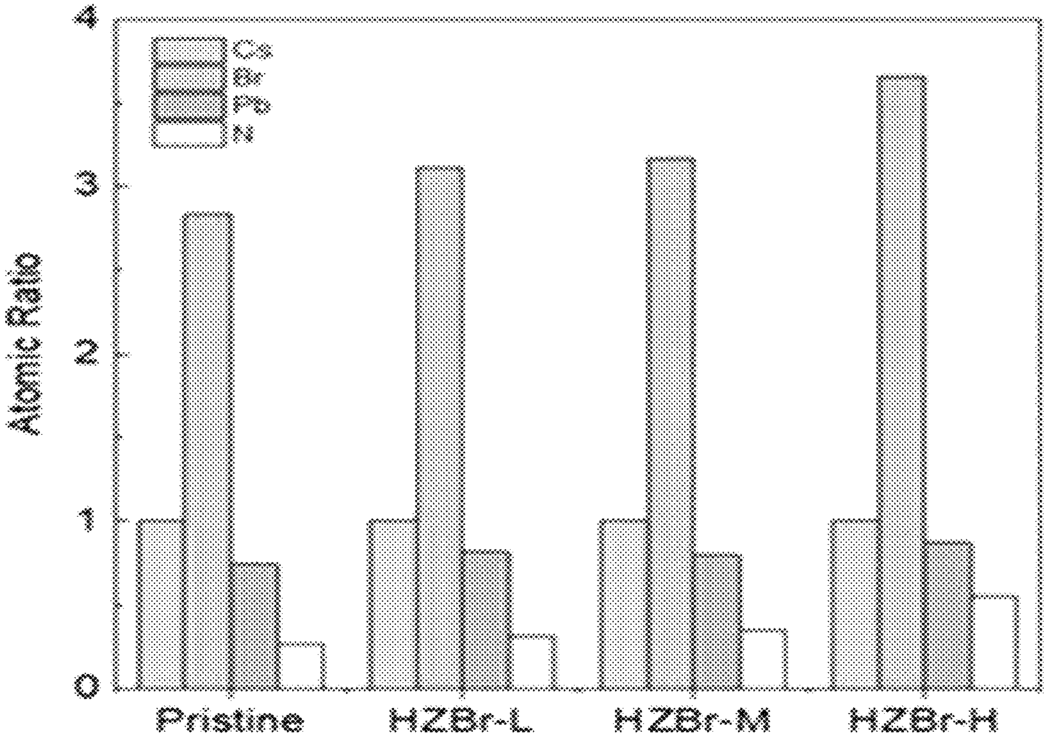
FIG. 26 shows atomic ratio analysis data of elements (Cs, Br, Pb, and N) obtained from XPS spectra of pure $CsPbBr_3$ NC, HZBr-L, HZBr-M, and HZBr-H.

While there was no significant change in the XPS spectra of the Pb 4f and Br 3d features, HZBr-H exhibited there was a noticeable peak shift ((d, e) in FIG. 25). Both the Pb $4f_{5/2}$ and Pb $4f_{7/2}$ peaks shifted to higher binding energies, that is, from 138.2 eV and 143.1 eV to 138.7 eV and 143.9 eV, respectively. On the other hand, the Br $3d_{5/2}$ and $3d_{3/2}$ peaks shifted toward lower binding energies, that is, from 68.0 eV and 69.1 eV to 67.8 eV and 68.8 eV, respectively. These peak shifts may be due to the enhancement of the structural integrity of the $[PbBr_6]^{4-}$ octahedron as the Br vacancies are filled with an excess of Br ions due to a high concentration of HZBr. The Br/Cs atomic ratios were determined to be 2.83, 3.11, 3.17, and 3.66 for pristine $CsPbBr_3$, HZBr-L, HZBr-M, and HZBr-H, respectively, thereby confirming that the Br vacancies were inhibited by the HZBr treatment. It was also observed that the nitrogen content continuously increased with increase in concentration of HZBr, from 0.27 to 0.55 (N/Cs atomic ratio) (FIG. 26).

[Fabrication Example 1] Fabrication of LED Made of $CsPbBr_3$ NCs Treated with Hydrazine Monohydrobromide A patterned ITO glass substrate (25 mm×25 mm) was sonicated sequentially in deionized water, acetone, and isopropyl alcohol for 15 minutes. The substrate was subjected to $N_2$ blowing, and then the substrate was further cleaned by UV-ozone treatment for 15 minutes. A poly-(ethylenedioxy thiophene):polystyrene-sulfonate (PEDOT:PSS) solution (Clevios P VP A14083 filtered through a 0.45 μm PES filter) was spin-coated onto the substrate at 8000 rpm for 15 seconds. After annealing at 150 °C for 15 minutes, the substrate was transferred to a nitrogen-filled glove box ($H_2O$ and $O_2$ are less than 1 ppm). To form a hole transport layer, poly(N,N'-bis(4-butylphenyl)-N,N'-bis (phenyl)-benzidine (poly-TPD, Sigma Aldrich, 1 mg/mL in chlorobenzene) and formamidinium bromide (7.5 mg/ml in dimethylformamide) was sequentially deposited by spin coating at 4000 rpm for 60 seconds. The prepared $CsPbBr_3$ NC solution (HZBr-L, NC concentration of 20 mg/mL) was spin-coated at 2000 rpm for 15 seconds. The prepared substrate was transferred to a thermal evaporator. 1,3,5-tris (N-phenylbenzimidazol-2-yl) benzene (TPBi, 42.5 nm), LiF (2 nm), and Al (80 nm) layers were sequentially deposited under a high vacuum condition at a pressure of $2.0\times10^{-5}$ torr or higher, at rates of 0.35, 0.1, 2.0 Å/s, respectively. Finally, optical epoxy (NOA71) was used to encapsulate the device in the glove box. The active area (4 $mm^2$) of the device is defined as the overlapping area between the ITO and Al electrodes.

Evaluation of Properties

1) Analysis Method:

Current-voltage (IV) characteristics were measured using a Keithley 2450 source measurer. Luminance and EL spectra were measured using an SR-3AR spectroradiometer (TOPCON). EQE was calculated from the obtained EL characteristics and Lambertian emission profiles. All instrumental measurements were performed under ambient conditions at room temperature.

Figure 27:
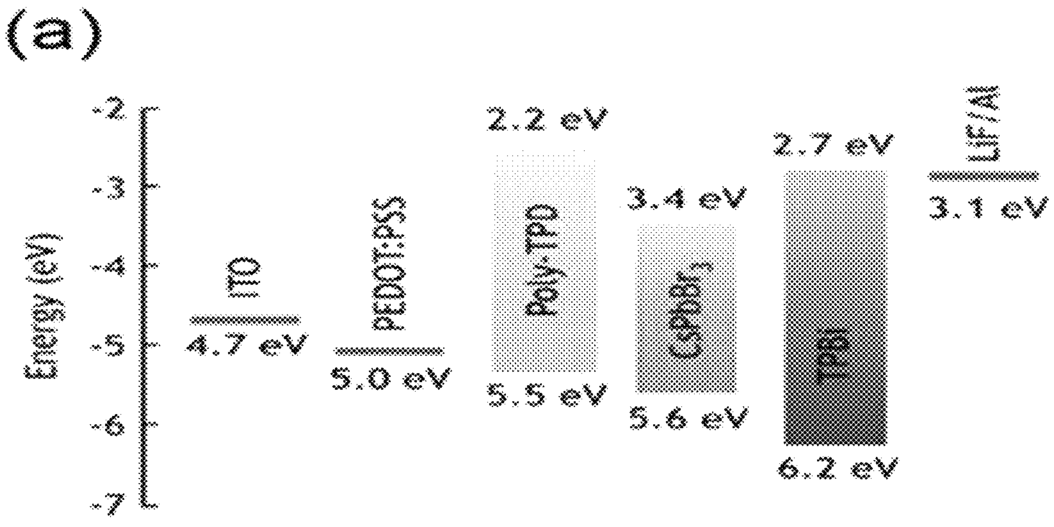
FIG. 27 is an energy level diagram of an LED according to an example of the present disclosure.
Figure 28:
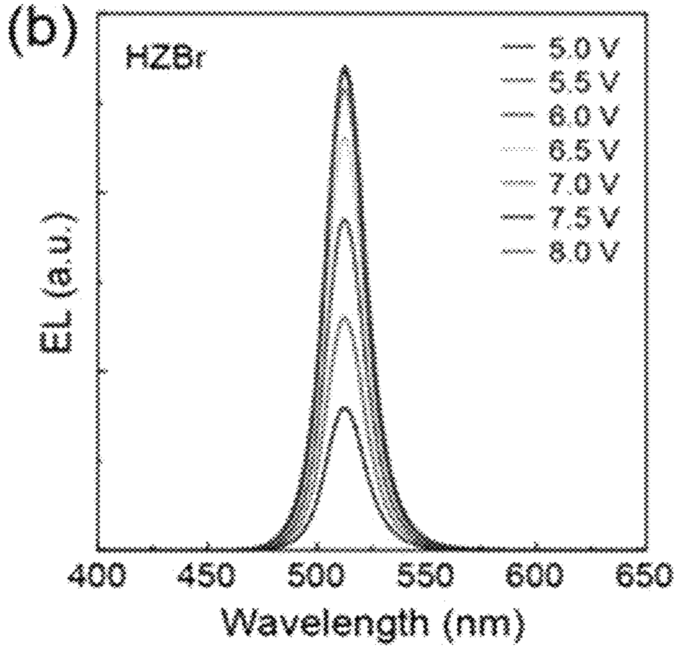
FIG. 28 is EL spectrum analysis data at an application voltage of 5.0 V to 8.0 V) of the LED.
Figure 29:
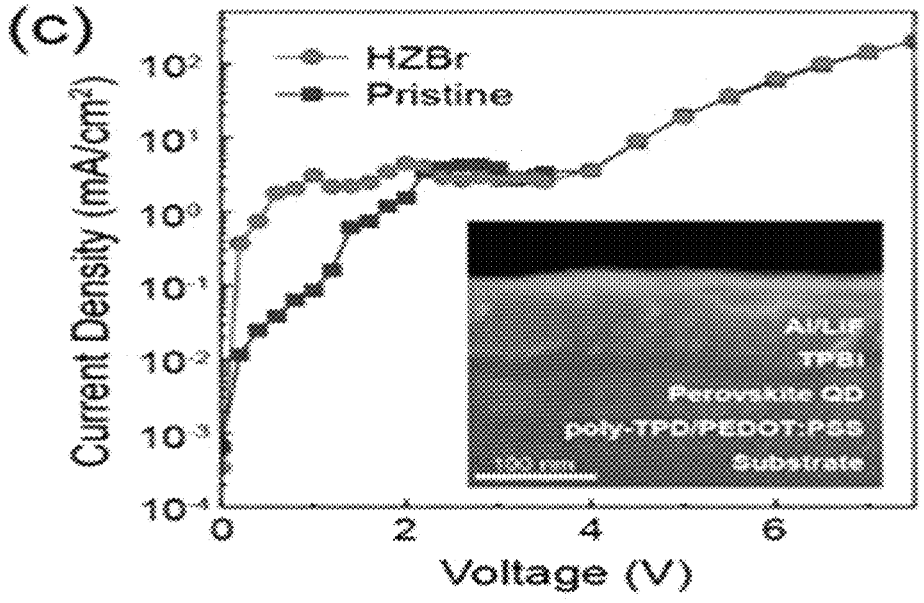
FIG. 29 is a current density curve according to driving voltage of an LED device fabricated using pure $CsPbBr_3$ NC or HZBr-treated $CsPbBr_3$ NC, in which the inset is a cross-sectional SEM image.
Figure 30:
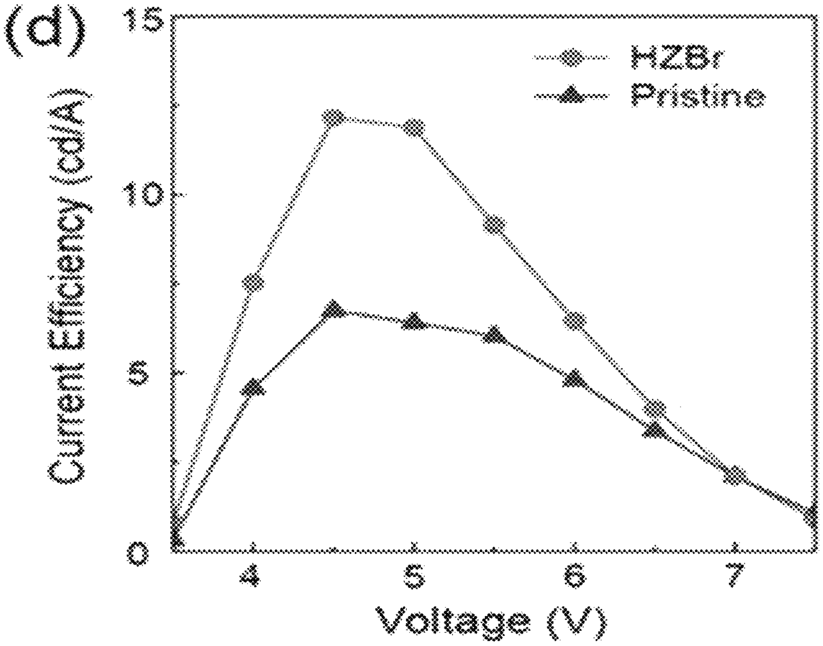
FIG. 30 is a current efficiency curve according to driving voltage of an LED device fabricated using pure $CsPbBr_3$ NC or HZBr-treated $CsPbBr_3$ NC.
Figure 31:
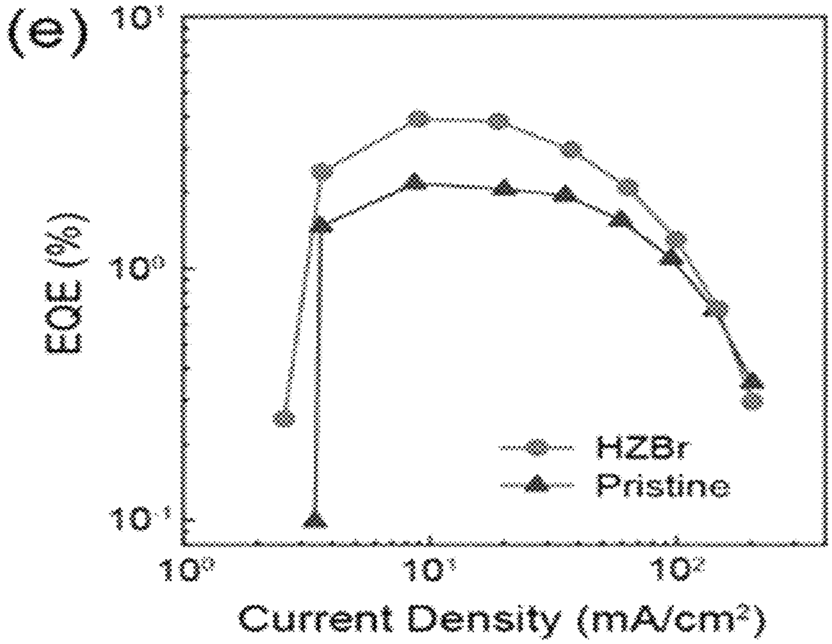
FIG. 31 is an EQE curve according to current density of an LED device fabricated using pure $CsPbBr_3$ NC or HZBr-treated $CsPbBr_3$ NC.
Figure 32:
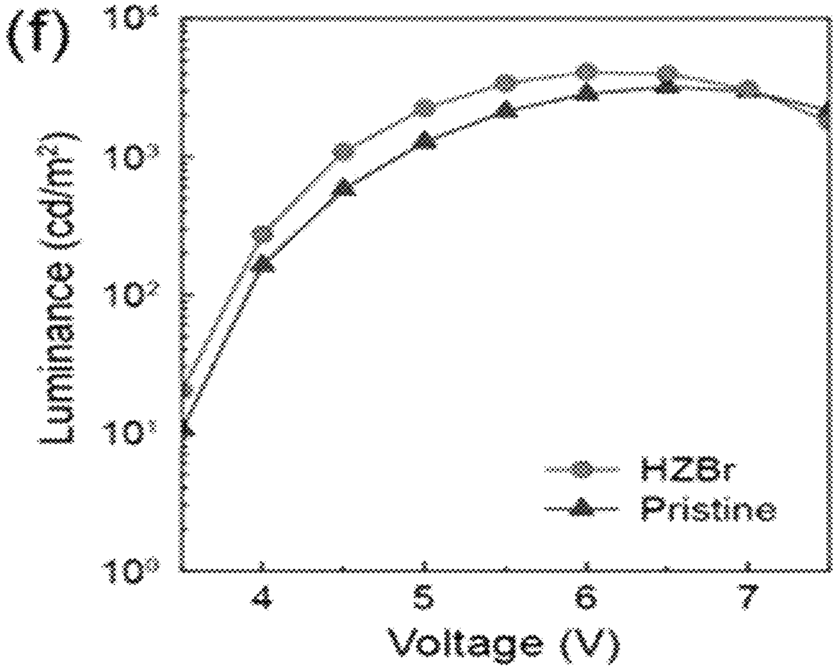
FIG. 32 is a luminance curve according to driving voltage of an LED device fabricated using pure $CsPbBr_3$ NC or HZBr-treated $CsPbBr_3$ NC.

2) Analysis:

A green LED based on $CsPbBr_3$ NCs was fabricated with a flat band energy level diagram for all functional layers (FIG. 27). As fabricated in Fabrication Example 1, the device is composed of multiple layers including a patterned ITO anode, a PEDOT:PSS (30 nm) film, a poly-TPD (10 nm) film, a $CsPbBr_3$ NC film (50 nm), a TPBi (42.5 nm) film, and a LiF/Al cathode (ITO/PEDOT:PSS/poly-TPD/$CsPbBr_3$/TPBi/LiF/Al). The EL spectra of the HZBr-treated $CsPbBr_3$ LED showed a single stable peak at 513 nm with a maximum EQE of 3.92% (FIG. 28). It was confirmed that the insulating ligands (i.e., oleylamine and oleic acid) were effectively replaced by shorter hydrazinium ligands as the current density of the HZBr-treated $CsPbBr_3$ LED increased significantly at low voltage, and an efficient hole-electron injection into the $CsPbBr_3$ NCs was facilitated (FIG. 29). That is, the LED using the HZBr-treated $CsPbBr_3$ NCs exhibited an increased current efficiency of 12.16 cd/A compared to LEDs using pristine $CsPbBr_3$ which had a current efficiency of 6.75 cd/A (FIG. 30). EQE was 2.17% in the case of using pristine $CsPbBr_3$ but EQE was increased to 3.92% in the case of using the HZBr-treated $CsPbBr_3$ (FIG. 31). The maximum luminance of the HZBr-treated $CsPbBr_3$ LED was 4100 cd/$m^2$ (FIG. 32).

Figure 33:
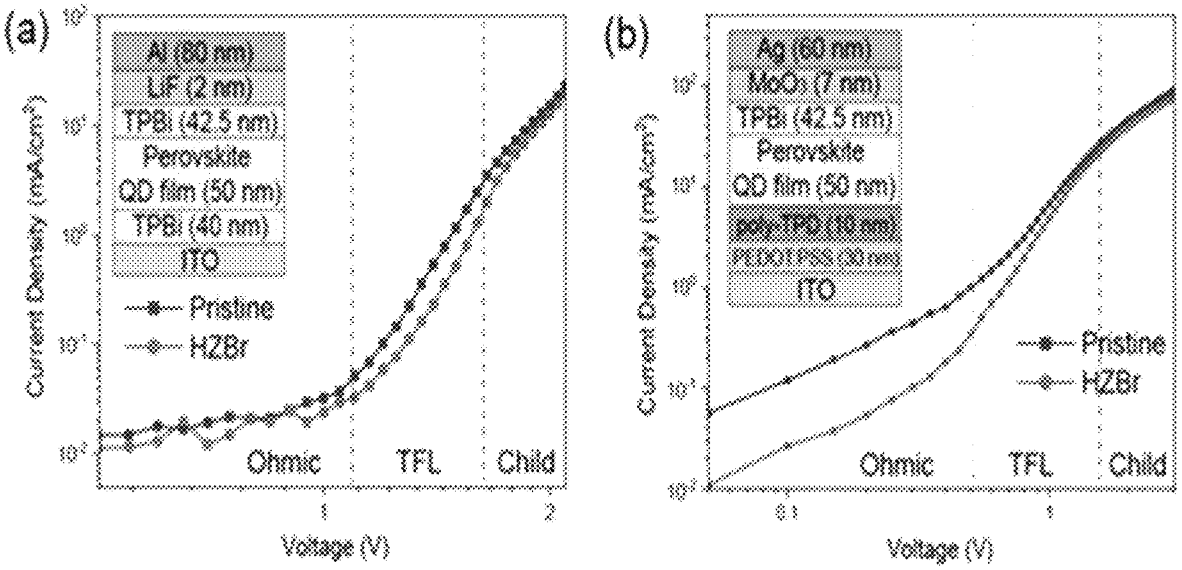
FIG. 33 shows current density curves according to driving voltages of (a) an electron-only device (ITO/TPBi/perovskite QD film/TPBi/LiF/Al) and (b) an hole-only device (ITO/PEDOT:PSS/poly-TPD/perovskite QD film/TPBi/$MoO_3$/Ag) which are fabricated using fabricated using pure $CsPbBr_3$ NCs or HZBr-treated $CsPbBr_3$ NCs in dark conditions, in which the inset shows the structure of each device.

In addition, a hole-only device using the HZBr-treated $CsPbBr_3$ NCs exhibited a reduced current density due to a decrease in the trap filling voltage compared to an existing hole-only device using pristine $CsPbBr_3$. However, there was no significant difference in current density between an existing electron-only device using pristine $CsPbBr_3$ and an electron-only device using the HZBr-treated $CsPbBr_3$ NCs (FIG. 33). This result suggests the dominant role of hole transport behavior in the LEDs using the HZBr treated $CsPbBr_3$. Thus, these results clearly indicate that shorter HZBr ligand shells with higher grafting densities improve radiative recombination of charge carriers by passivating surface Br vacancies and the associated defect states without the usual compromise between charge transfer efficiency and insulating ligands. These results indicate that the charge injection efficiency is increased by promoting charge carrier delocalization on the surface of $CsPbBr_3$ NCs.

The present disclosure has been described with reference to some specific examples and features. However, the specific examples and features are only for illustrative purposes and are not intended to limit the scope of the present disclosure, and it will be appreciated by those skilled in the art that various modifications and changes are possible on the basis of the description of the examples given above.

Therefore, the spirit of the present disclosure is not limited to the specific examples described above, and all forms defined by the appended claims and all equivalents and modifications thereto fall within the scope of the present disclosure.

What is claimed is:

1. A perovskite nanocrystal with improved colloidal stability, the perovskite nanocrystal comprising:

a $CsPbX_3$ (X is halogen) perovskite nanocrystal; and a hydrazinium ($NH_2$-$NH_3^+$) ligand bound to a surface of the $CsPbX_3$ perovskite nanocrystal.

2. The perovskite nanocrystal with improved colloidal stability of claim 1, wherein the perovskite nanocrystal with improved colloidal stability has a particle size of 10 nm or less.

3. The perovskite nanocrystal with improved colloidal stability of claim 1, wherein the perovskite nanocrystal with improved colloidal stability has an interparticle distance of 1.8 nm or less.

4. The perovskite nanocrystal with improved colloidal stability of claim 1, wherein the perovskite nanocrystal with improved colloidal stability has a zeta potential (ζ) of 10 mV or more.

5. The perovskite nanocrystal with improved colloidal stability of claim 1, wherein X includes Br, and the perovskite nanocrystal with improved colloidal stability has a Br/Cs atomic ratio in a range of 2.9 to 3.5.

6. The perovskite nanocrystal with improved colloidal stability of claim 1, wherein the perovskite nanocrystal with improved colloidal stability has a carrier trapping activation energy ($\Delta E_{trap}$) value of 60 meV or more.

7. A method for producing a perovskite nanocrystal with improved colloidal stability, the method comprising:

a) preparing a $CsPbX_3$ (X is halogen) perovskite nanocrystal dispersion; and b) injecting the $CsPbX_3$ perovskite nanocrystal dispersion into a hydrazinium halide reaction solution and stirring the mixture.

8. The method of claim 7, wherein the $CsPbX_3$ perovskite nanocrystal dispersion has a concentration of 0.5 to 50 mg/mL.

9. The method of claim 8, wherein the hydrazinium halide reaction solution has a concentration that is higher than 0 mM and lower than 10 mM.

10. The method of claim 7, wherein the $CsPbX_3$ perovskite nanocrystal dispersion is prepared by:

(i) preparing a precursor solution A containing $PbX_2$, a fatty acid, and a fatty amine;

(ii) mixing cesium oleate with the precursor solution A;

(iii) collecting nanocrystals from the resulting mixture of (ii); and (iv) dispersing the nanocrystals in a dispersion medium.

11. The method of claim 10, wherein the fatty acid is at least one selected from saturated fatty acids having 14 to 24 carbon atoms and unsaturated fatty acids having 14 to 24 carbon atoms.

12. The method of claim 10, wherein the fatty amine is at least one selected from saturated fatty amines having 14 to 24 carbon atoms and unsaturated fatty amines having 14 to 24 carbon atoms.

13. A light emitting device comprising the perovskite nanocrystal with improved colloidal stability of claim 1.

* * * * *